United States Patent
Gahinet et al.

(10) Patent No.: US 9,886,008 B1
(45) Date of Patent: Feb. 6, 2018

(54) AUTOMATED PID CONTROLLER DESIGN, USING PARAMETERS THAT SATISFY A MERIT FUNCTION

(71) Applicant: The MathWorks, Inc., Natick, MA (US)

(72) Inventors: Pascal Gahinet, Hopkinton, MA (US); Rong Chen, Tolland, CT (US); Bora Eryilmaz, Boston, MA (US); Baljeet Singh, Framingham, MA (US)

(73) Assignee: The MathWorks, Inc., Natick, MA (US)

( * ) Notice: Subject to any disclaimer, the term of this patent is extended or adjusted under 35 U.S.C. 154(b) by 888 days.

(21) Appl. No.: 13/912,956

(22) Filed: Jun. 7, 2013

(51) Int. Cl.
    *G05B 13/02* (2006.01)
(52) U.S. Cl.
    CPC ................... *G05B 13/021* (2013.01)
(58) Field of Classification Search
    CPC .... G05B 13/021; G05B 13/042; G05B 11/42; G05B 2219/25298
    See application file for complete search history.

(56) References Cited

U.S. PATENT DOCUMENTS

| | | | |
|---|---|---|---|
| 5,394,322 A | 2/1995 | Hansen | |
| 6,055,524 A * | 4/2000 | Cheng | G06N 3/0635 706/14 |
| 6,510,353 B1 | 1/2003 | Gudaz et al. | |
| 7,035,695 B2 | 4/2006 | Boiko | |
| 7,158,840 B2 | 1/2007 | Jacques | |
| 7,599,752 B2 | 10/2009 | Chen | |
| 7,865,254 B2 | 1/2011 | Gahinet et al. | |
| 7,890,198 B1 | 2/2011 | Gahinet | |
| 7,925,362 B2 | 4/2011 | Lee et al. | |
| 8,060,340 B2 | 11/2011 | Gao et al. | |
| 8,180,464 B2 | 5/2012 | Gao et al. | |
| 8,185,217 B2 * | 5/2012 | Thiele | G05B 13/042 700/29 |
| 8,200,346 B2 * | 6/2012 | Thiele | G05B 17/02 700/44 |
| 8,666,708 B2 * | 3/2014 | Miura | G05B 13/04 703/2 |
| 8,996,141 B1 * | 3/2015 | Alsaleem | F25B 49/02 700/37 |
| 9,158,291 B1 * | 10/2015 | Gahinet | G05B 13/042 |

(Continued)

FOREIGN PATENT DOCUMENTS

JP 07281707 A 10/1995

OTHER PUBLICATIONS

Araki, Mituhiko, et al., "Two-Degree-of-Freedom PID Controllers," International Journal of Control, Automation, and Systems, vol. 1, No. 4, Dec. 2003, pp. 1-11.

(Continued)

*Primary Examiner* — M. N. Von Buhr
(74) *Attorney, Agent, or Firm* — Cesari and McKenna, LLP; Michael R. Reinemann

(57) ABSTRACT

Embodiments provide techniques, computer-readable media, and devices for allowing users to perform interactive design of controllers, such as PID controllers, in a free-form modeling environment. Users can tune controllers using characteristics familiar to typical users rather than having to specify gain values for the controller, which may be difficult for a user to relate to the performance of a controller.

37 Claims, 20 Drawing Sheets

(56) References Cited

U.S. PATENT DOCUMENTS

| | | | | |
|---|---|---|---|---|
| 2003/0199997 | A1* | 10/2003 | Gao | G05B 5/01 700/18 |
| 2004/0153173 | A1* | 8/2004 | Chang | G05B 13/024 700/37 |
| 2005/0251272 | A1* | 11/2005 | Yu | G05B 5/01 700/72 |
| 2005/0256593 | A1* | 11/2005 | Ogunnaike | G05B 13/048 700/44 |
| 2006/0265085 | A1* | 11/2006 | Chen | G05B 13/024 700/41 |
| 2007/0276512 | A1* | 11/2007 | Fan | G05B 11/32 700/37 |
| 2010/0292813 | A1 | 11/2010 | Boiko et al. | |
| 2011/0040393 | A1* | 2/2011 | Cheng | G05B 13/02 700/42 |
| 2012/0035747 | A1 | 2/2012 | Gao | |
| 2012/0053705 | A1 | 3/2012 | Bensoussan | |

OTHER PUBLICATIONS

"MATLAB Programming," MATLAB & Simulink R2007a, The MathWorks, Inc., <http://www.mathworks.com/products/new_products/release2007a.html>, Mar. 1, 2007, pp. 1-72.

"Notification of Transmittal of the International Search Report and the Written Opinion of the International Searching Authority, or the Declaration," International Filing Date: Mar. 30, 2010, International Application No. PCT/US2010/000940, Applicant: The MathWorks, Inc., Date of Mailing: Aug. 13, 2010, pp. 1-24.

"Simulink Response Optimization: Frequency Domain Response Optimization Example," MATLAB & Simulink R2007a, The MathWorks, Inc., <http://www.mathworks.com/products/new_products/release2007a.html>, Mar. 1, 2007, pp. 1-72.

Wang, Qing-Guo, et al., "PID Tuning With Exact Gain and Phase Margins," Elsevier Science LTD., ISA Transactions vol. 38, 1999, pp. 243-249.

* cited by examiner

AUTOMATED PID CONTROLLER DESIGN, USING PARAMETERS THAT SATISFY A MERIT FUNCTION

BACKGROUND INFORMATION

Modeling applications may let users create system models in a free-form environment that does not restrict the user to creating models of a certain order (e.g., a first order system model or a first order system model with time delay). Free-form environments may instead let a user create system models of almost any order and/or type. At times, users may find these free-form models difficult to work with.

For example, users may find it difficult to design controllers for system models developed in the free-form environment. Controller design may be difficult because the user may have to specify the controller in terms of certain parameters that may be non-intuitive.

Assume that the user wishes to implement a proportional integral derivative (PID) controller for a system model developed in the free-form environment. The user may have desired characteristics in mind for the controller, such as a phase margin, or a closed-loop response speed. Conventional applications may require that the user relate these desired controller characteristics to particular values for P, I and D gains that are used to design the controller. Relating desired characteristics to values of P, I, and D may prove difficult for the user because the relation of gains for P, I and D to the desired characteristics (e.g., phase margin or closed-loop response speed) is complex, nonlinear, and non-intuitive to the average user of a free-form modeling application. These difficulties may cause the user to resort to trial-and-error guesswork for values of P, I and D in the hopes that he/she eventually designs a controller that achieves an acceptable, or desired, response for the feedback system (i.e., the combination of the controller and the system).

Difficulties faced by users of free-form modeling environments when designing controllers for free-form models may discourage users from making use of free-form environments for designing certain types of controllers, such as complex controllers.

BRIEF DESCRIPTION OF THE DRAWINGS

The accompanying drawings, which are incorporated in and constitute a part of this specification, illustrate one or more embodiments of the invention and, together with the description, explain the invention. In the drawings.

DETAILED DESCRIPTION OF ILLUSTRATIVE EMBODIMENTS

Figure 1:
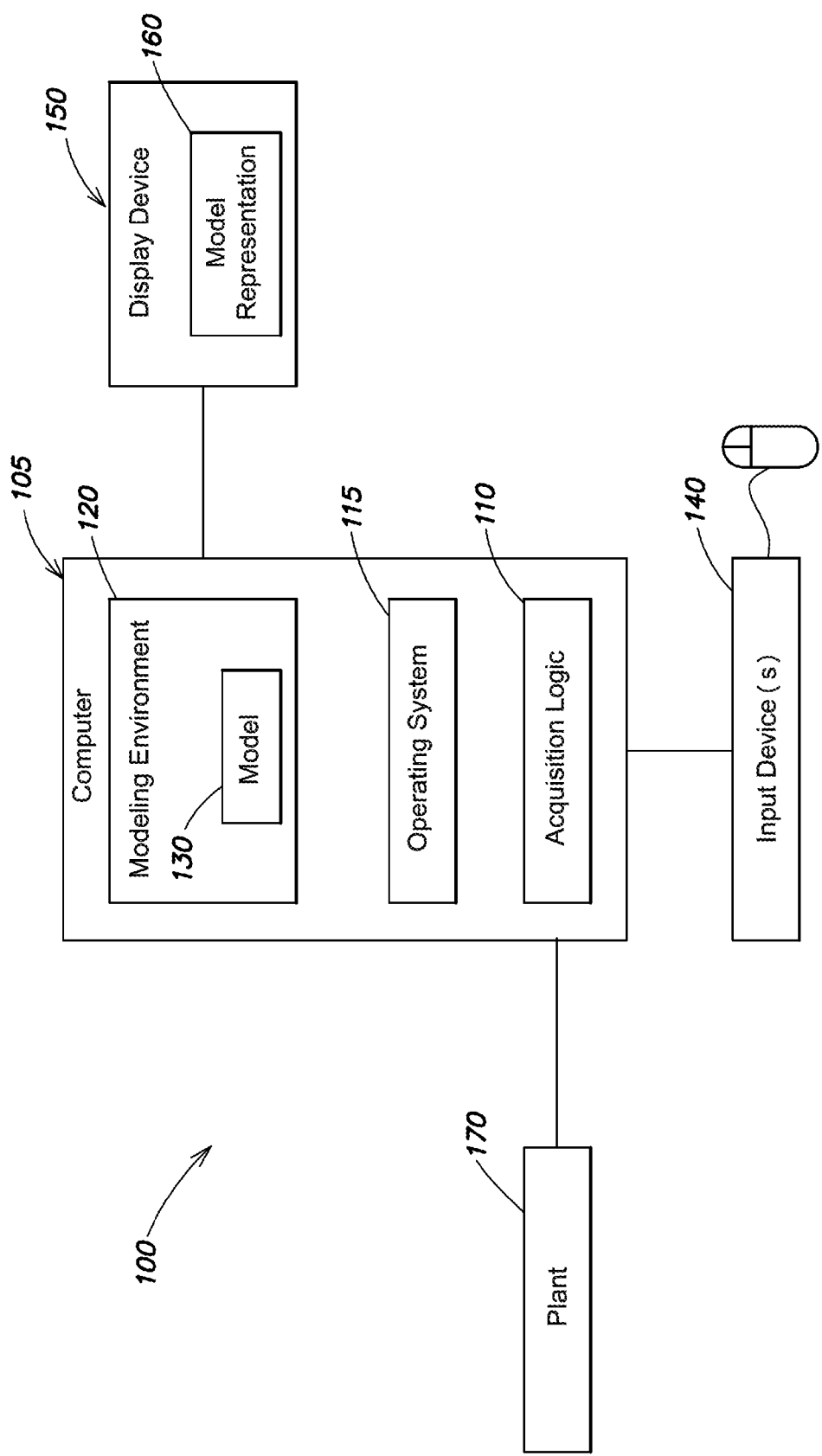
FIG. 1 illustrates an exemplary system for practicing an embodiment of the invention.

The following detailed description of implementations consistent with principles of the invention refers to the accompanying drawings. The same reference numbers in different drawings may identify the same or similar elements. Also, the following detailed description does not limit the invention. Instead, the scope of the invention is defined by the appended claims and their equivalents.

Overview

Exemplary embodiments include methods, computer-readable media, and apparatuses for tuning proportional integral (PI) and proportional integral derivative (PID) controllers. Embodiments allow a user to specify controller performance specifications using tuning parameters familiar to the average user, such as, but not limited to, closed-loop response speed, closed-loop bandwidth, phase margin, etc. These performance specifications differ from tuning parameters used for the controller, such as P, I and D gains. Allowing a user to use performance specifications to design a controller can facilitate intuitive interaction between a user and a controller design application, such as a controller toolbox, that operates with a free-form modeling environment.

An embodiment of the invention allows the user to design a controller without having to manually determine and/or tune P, I, and D gains for the controller. For example, an implementation may operate from the open-loop frequency response and can work with a single-input single-output (SISO) loop representation for a system. Other embodiments can work with multiple input multiple output (MIMO) systems when the systems are sequentially processed one loop at a time. The embodiment can work without restriction on a plant order or presence of time delays in the plant. For example, a user may design a PID controller that achieves a performance objective, such as a desired bandwidth and/or phase margin, while satisfying a robustness index (e.g., overshoot, gain margin, etc.) defined by the user. The user may achieve the objective by specifying parameters like the closed loop bandwidth and phase margin. In contrast, conventional approaches may require that the user try values for P, I, and D until the user eventually obtains satisfactory performance.

Another embodiment may provide the user with a graphical user interface (GUI) that includes input mechanisms (e.g., sliders) that allow the user to change phase margin, closed loop bandwidth, and/or response speed as the controller executes. The embodiment may display response curves, e.g., amplitude vs. time curve, as the user manipulates the input mechanisms, thereby supporting interactive controller design.

Embodiments can also support code generation, whereby executable code for controllers can be generated. For example, a user may define a PID controller for a fuel injection system used in an automobile. The user may generate code, e.g., C++ code, that implements the controller and may transfer the code to a processing device that will implement the controller in the automobile (e.g., an embedded controller in the automobile).

Exemplary System

FIG. 1 illustrates an exemplary system 100 for practicing an embodiment. System 100 may be used to construct a model that includes one or more entities, to design and implement a PID controller for the model, and/or to generate code for the controller. System 100 may include computer 105, acquisition logic 110, operating system 115, modeling environment 120, model 130, input device 140, display device 150 model representation 160, and plant 170. The system in FIG. 1 is illustrative and other embodiments of system 100 can include fewer devices, more devices, and/or devices in configurations that differ from the configuration of FIG. 1.

Computer 105 may include a device that performs processing operations, display operations, communication operations, etc. For example, computer 105 may include logic, such as one or more processing or storage devices, that can be used to perform and/or support processing activities on behalf of a user. Embodiments of computer 105 may include a desktop computer, a laptop computer, a client, a server, a mainframe, a personal digital assistant (PDA), a web-enabled cellular telephone, a smart phone, smart sensor/actuator, or another computation or communication device that executes instructions to perform one or more activities and/or to generate one or more results.

Computer 105 may further perform communication operations by sending data to or receiving data from another device (not shown in FIG. 1). Data may refer to any type of machine-readable information having substantially any format that may be adapted for use in one or more networks and/or with one or more devices. Data may include digital information or analog information. Data may further be packetized and/or non-packetized.

Acquisition logic 110 may acquire data from devices external to computer 105 and may make the data available to computer 105. For example, acquisition logic 110 may include analog-to-digital converters, digital-to-analog converters, filters, multiplexers, etc., which are used to make data available to computer 105. Computer 105 may use acquired data to perform modeling operations, PID controller design activities, etc.

Operating system 115 may manage hardware and/or software resources associated with computer 105. For example, operating system 115 may manage tasks associated with receiving user inputs, operating computing environment 105, allocating memory, prioritizing system requests, etc. In an embodiment, operating system 115 may be a virtual operating system. Embodiments of operating system 115 may include Linux, Mac OS, Microsoft Windows, Solaris, UNIX, etc. Operating system 115 may further run on a virtual machine, which can be provided by computer 105.

Modeling environment 120 may provide a computing environment that allows users to perform simulation or modeling tasks related to disciplines, such as, but not limited to, mathematics, science, engineering, medicine, business, etc. Modeling environment 120 may support one or more applications that execute instructions to allow a user to construct a model having executable semantics. For example, in an embodiment, modeling environment 120 may allow users to create free-form models (e.g., first, second, third, fourth, fifth, etc., order models) having executable semantics. Modeling environment 120 may further support time-based, event-based, etc., modeling activities.

Model 130 may include information for a textual or graphical model. For example, model 130 may include information for textual models or a graphical models that can be time-based models, event-based models, state transition models, data flow models, component diagrams, entity flow diagrams, equation based language diagrams, etc. Graphical embodiments of model 130 may include entities (e.g., blocks, icons, etc.) that represent executable code for performing operations. Code for the entities may be executed to perform a simulation using the model. Entities may be connected together using lines that represent pathways for transferring data from one entity to another in the model.

Input device 140 may receive user inputs. For example, input device 140 may transform a user motion or action into a signal or message that can be interpreted by computer 105. Input device 140 can include, but is not limited to, keyboards, pointing devices, biometric devices, accelerometers, microphones, cameras, haptic devices, etc.

Display device 150 may display information to a user. Display device 150 may include a cathode ray tube (CRT), plasma display device, light emitting diode (LED) display device, liquid crystal display (LCD) device, etc. Embodiments of display device 150 may be configured to receive user inputs (e.g., via a touch sensitive screen) if desired. In an embodiment, display device 150 can display one or more graphical user interfaces (GUIs) to a user. The GUIs may include model 130 and/or other types of information.

Model representation 160 may include a visual representation provided by model 130. For example, model representation 160 may be displayed to a user and may include a number of entities connected by lines. When model 130 is executed, model representation 160 may change to show, for example, the flow of data through the model.

Plant 170 may include one or more devices that provide data to computer 105. For example, plant 170 may include an engine system that is monitored using sensors, such as accelerometers, thermocouples, opto-electric transceivers, strain gauges, etc. In an embodiment, acquisition logic 110 may receive signals from plant 170 in analog or digital form and may transform the signals into a form suitable for use in computer 105.

Exemplary Modeling Environment

Figure 2:
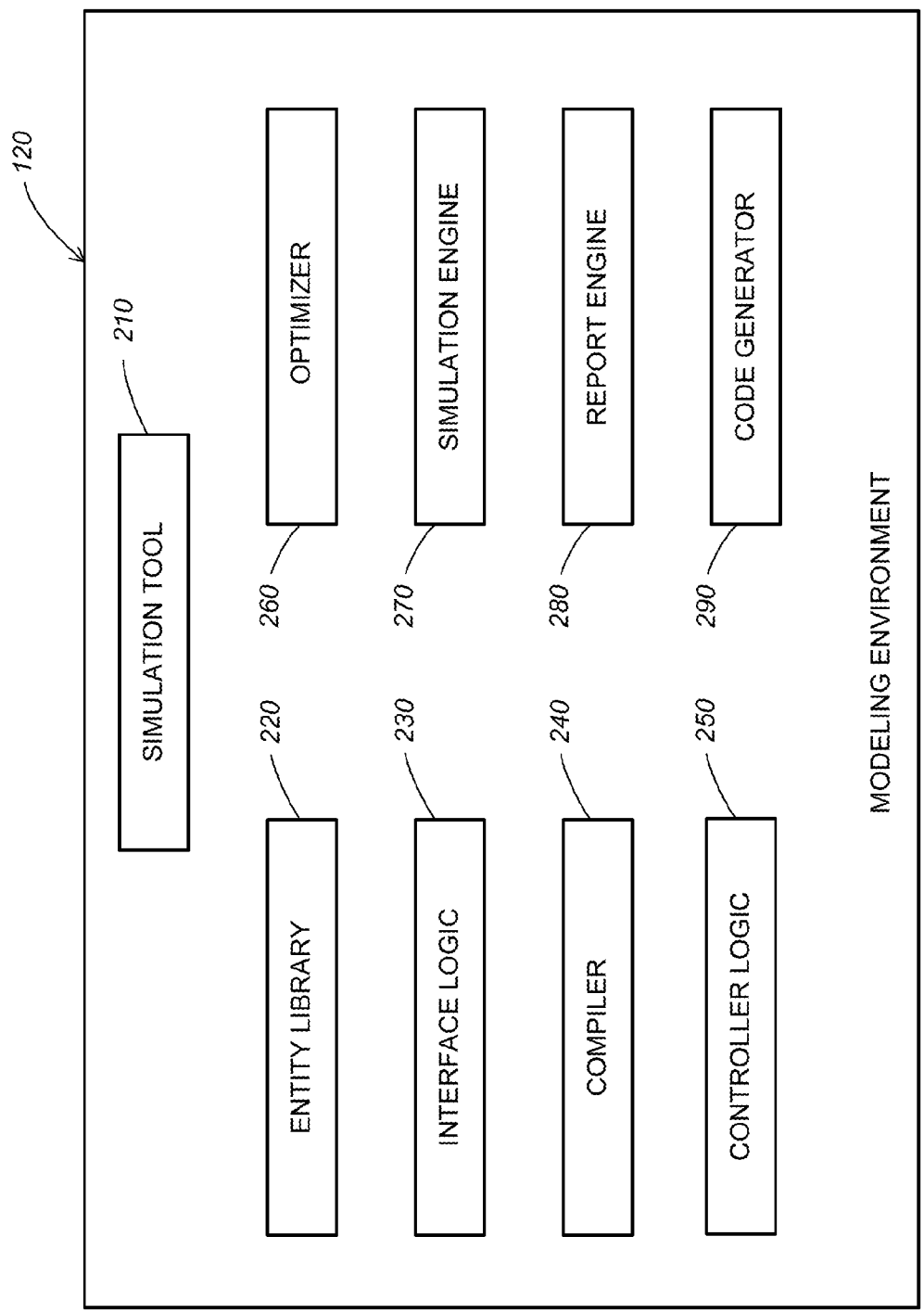
FIG. 2 illustrates an exemplary functional diagram for practicing an embodiment of the invention.

FIG. 2 illustrates an exemplary embodiment of a modeling environment 120. Modeling environment 120 can include simulation tool 210, entity library 220, interface logic 230, compiler 240, controller logic 250, optimizer 260, simulation engine 270, report engine 280, and code generator 290. The embodiment of modeling environment 120 illustrated in FIG. 2 is illustrative and other embodiments of modeling environment 120 can include more entities or fewer entities without departing from the spirit of the invention.

Simulation tool 210 may be an application for building a model. Simulation tool 210 can be used to build a textual model or a graphical model having executable semantics. In the case of graphical models, simulation tool 210 may allow users to create, modify, diagnose, delete, etc., model entities and/or connections. Simulation tool 210 may interact with other entities illustrated in FIG. 1 or 2 for receiving user inputs, executing a model, displaying results, generating code, etc.

Entity library 220 may include code modules or entities (e.g., blocks/icons) that a user can drag and drop into a display window that includes model representation 160. In the case of graphical models, a user may further couple entities using connections to produce a graphical model of a system, such as plant 170.

Interface logic 230 may allow modeling environment 120 to send or receive data and/or information to/from devices (e.g., a target environment) or software modules (e.g., an application program interface). In an embodiment, interface logic 230 may interface acquisition logic 110 with modeling environment 120.

Compiler 240 may compile a model into an executable format. Compiled code produced by compiler 240 may be executed on computer 105 to produce a modeling result. In an embodiment, compiler 240 may also provide debugging capabilities for diagnosing errors associated with the model.

Controller logic 250 may be used to create and implement controllers in model 130. For example, controller logic 250 may provide functionality for entities that represent types of controllers in model representation 160. When a model executes, controller logic 250 may perform control operations on the model by interacting with entities in model representation 160. In an embodiment, controller logic 250 may include control algorithms that implement controllers (e.g., PID controllers) in model representation 160. Embodiments of controller logic 250 may be configured to operate in standalone or distributed implementations.

Optimizer 260 may optimize code for a model. For example, optimizer 260 may optimize code to cause the code to occupy less memory, to cause the code to execute more efficiently, to cause the code to execute faster, etc., than the code would execute if the code were not optimized. Optimizer 260 may also perform optimizations for controller logic 250, e.g., to optimize parameters for a controller. In an embodiment, optimizer 260 may operate with or may be integrated into compiler 240, controller logic 250, code generator 290, etc.

Simulation engine 270 may perform operations for executing a model to simulate a system. Simulation engine 270 may be configured to perform standalone or remote simulations based on user preferences or system preferences.

Report engine 280 may produce a report based on information in modeling environment 120. For example, report engine 280 may produce a report indicating whether a PID controller satisfies design specifications, a report indicating whether a controller operates in a stable manner, a report indicating whether a model compiles properly, etc. Embodiments of report engine 280 can produce reports in an electronic format for display on display device 150, in a hardcopy format, and/or a format adapted for storage in a storage device.

Code generator 290 can generate code from a model. In an embodiment, code generator 290 may receive code in a first format and may transform the code from the first format into a second format. In an embodiment, code generator 290 can generate source code, assembly language code, binary code, interface information, configuration information, performance information, task information, etc., from at least a portion of a model. For example, code generator 290 can generate C, C++, SystemC, Java, Structured Text, etc., code from the model.

Embodiments of code generator 290 can further generate Unified Modeling Language (UML) based representations and/or extensions from some or all of a graphical model (e.g., System Modeling Language (SysML), Extensible Markup Language (XML), Modeling and Analysis of Real Time and Embedded Systems (MARTE), Hardware Description Language (HDL), Automotive Open System Architecture (AUTOSAR), etc.). In an embodiment, optimizer 260 can interact with code generator 290 to generate code that is optimized according to a parameter (e.g., memory use, execution speed, multi-processing, etc.).

Embodiments of the invention may be used to interactively design controllers for use in non-linear models of substantially any order and/or delay. Embodiments can be configured to use exact linearization techniques to produce linear time invariant models that can represent at least a portion of a non-linear model.

Exemplary Model Representation

Figure 3:
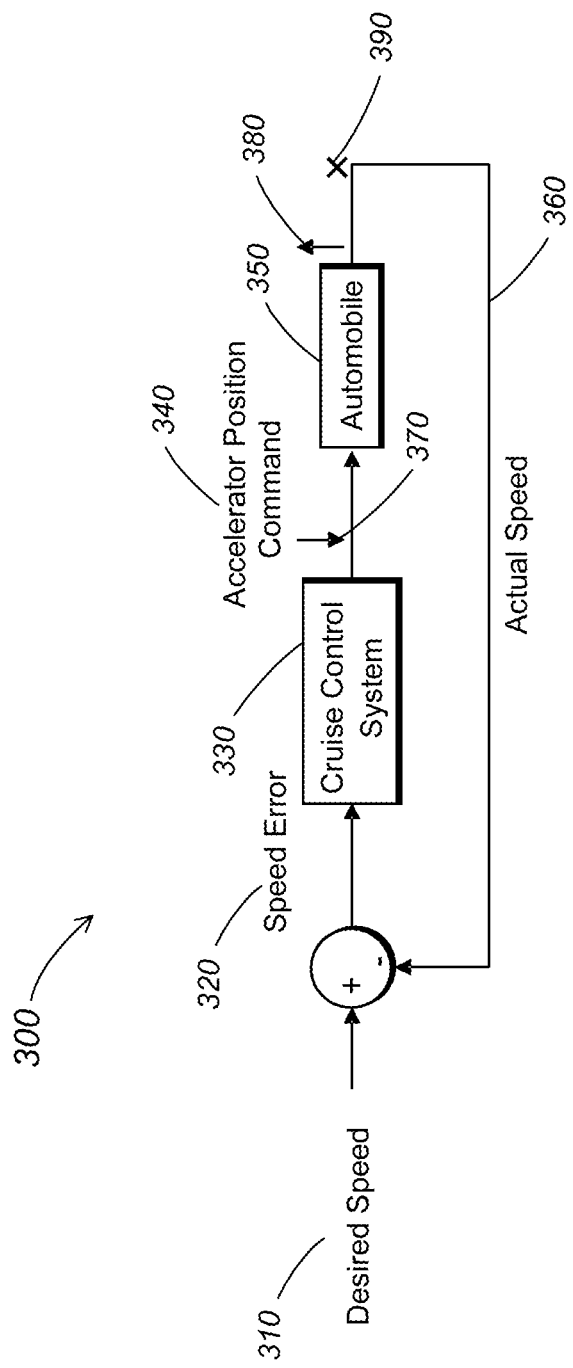
FIG. 3 illustrates an exemplary representation of a model.

FIG. 3 illustrates an exemplary representation of a model 300. Model 300 illustrates a system for controlling the speed of a vehicle traveling at a desired speed 310, which may be a user defined speed. In model 300, a cruise control system 330 may be designed for automobile 350. A desired speed 310 and an actual speed 360 are compared to arrive at speed error 320. Speed error 320 may be input to cruise control system 330, and cruise control system 330 may adjust the automobile's speed. Cruise control system 330 is in communication with accelerator position command 340 to set the position of the accelerator pedal, thus adjusting the speed of automobile 350. Automobile 350 can provide output feedback, through the speedometer, in the form of actual speed 360 for comparison, again, with desired speed 310.

In FIG. 3, actual speed 360 is a signal referred to as a feedback signal. Actual speed 360 is used to compute speed error 320, which is the difference between the desired speed 310 and actual speed 360. Cruise control system 330 is designed to respond to speed error 320 and compute an accelerator position command 340 to change the speed of automobile 350.

Designing cruise control system 330 may require that the behavior of automobile 350 is known. Successful design of cruise control system 330 may further require an understanding of how the position of the accelerator pedal affects the speed of automobile 350 over time. An accurate understanding of the behavior of the automobile 350 may allow for the design of a robust cruise control system 330. In some situations, a behavior of the automobile can be captured in a system model.

In some cases, such as the cruise control system, accurate models of physical systems require very complex descriptions. For example, the automobile may be nonlinear system, for which analysis and control design techniques may be unavailable. For example, users wishing to simulate the nonlinear automobile may need to use approximations to numerically represent the automobile. By way of example, the nonlinear automobile model may be approximated using techniques, such as linearization. Linearization may be applied to a single portion of the automobile model (e.g., to an operating point) or to several portions of the automobile model. When linearization is applied to multiple portions of a model, the approximations may be combined using gain scheduling techniques by combining linearized models obtained at various operating inputs to arrive at an approximation for the automobile model.

Still referring to FIG. 3, when model 300 is linearized over a portion of the model, linearization points may be selected. For example, a first linearization point may be identified using icon 370 and a second linearization point may be identified using icon 380. Linearization points 370 and 380 may be used to identify a portion of model 300 to be linearized. Embodiments, may allow a user to select linearization points 370, 380 or they may be programmatically determined (e.g., without user input). An open loop point 390 may be specified and may indicate an opening, or break, in feedback loop 360. Breaking feedback loop 360 may aid in linearizing a portion of model 300. For example, icons 370, 380, and 390 can be used to specify the linearization of the automobile model alone, i.e., without the closed-loop and the controller.

When linearization points 370, 380 and open loop point 390 are selected, an operating point may be selected. The operating point may be a point around which model 300 is linearized and may define the state of model 300 at a particular time.

For example, in a model of a car engine, the operating points are typically described by variables such as engine speed, throttle angle, engine temperature, and the surrounding atmospheric condition. The behavior or what is typically known as the "dynamics" of the model, is generally affected by the values of the operating points. For example in a car, the behavior of an engine can greatly vary if the car is being operated in the high elevations or the low elevations. In this case the elevation is part of an operating point for the car engine. A linear model is an approximation that may be valid in a small region around the operating point of the system. Near the operating point the approximation may be good, while far away the approximation may be poor. A linear model of a car being operated at 3000 ft. will be very accurate at elevations close to 3000 ft. but less accurate as the car travels at, for example, sea level.

Figure 4:
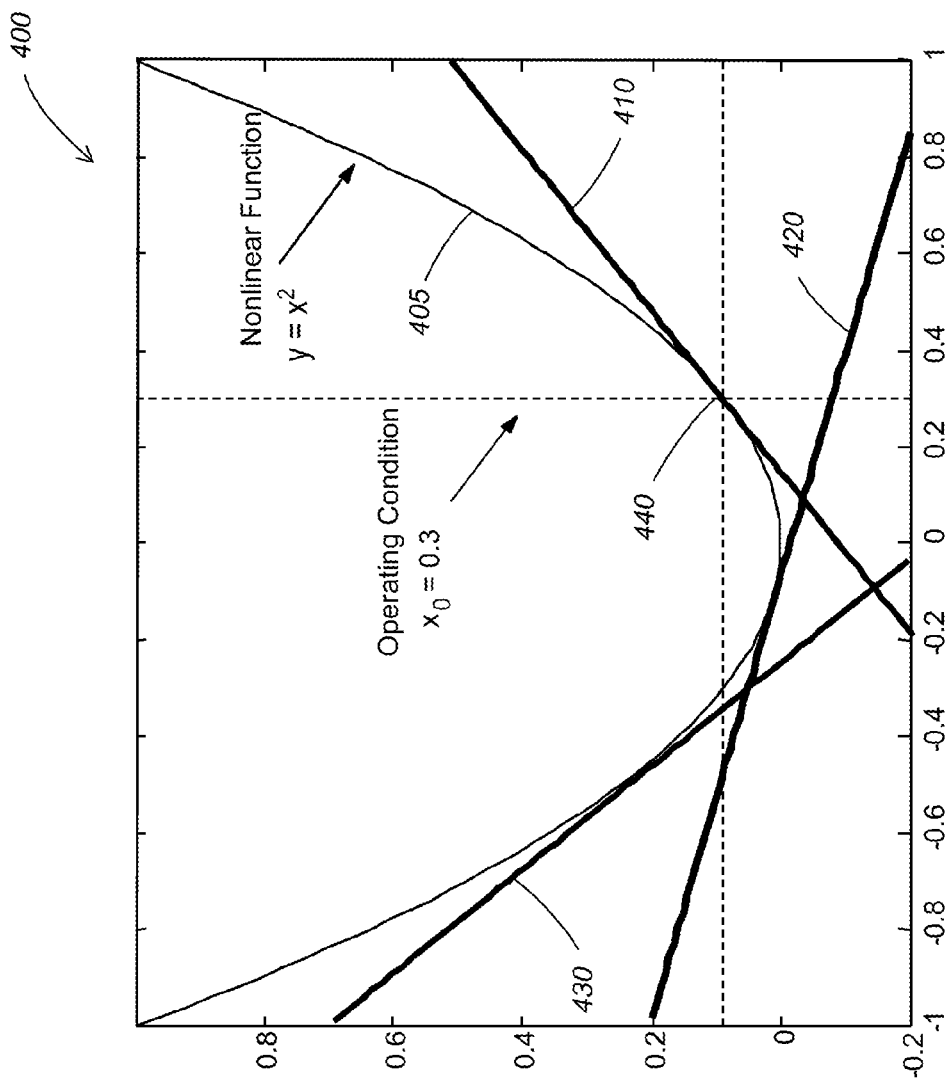
FIG. 4 illustrates an exemplary approximation technique for linearizing nonlinear models.

An example showing a linear approximation technique applied to a non-linear function is shown in FIG. 4.

FIG. 4 illustrates an operating point 440 with an exemplary non-linear function 405 indicated as $y=x^2$. If the linear approximation 410 is picked to be at $x=0.3$, the original function may be approximated as $y \approx 0.09 + 0.6(x-0.3)$. This linear approximation 410 is the equation of a straight line. The original function is intersected by the linear approximation at $x=0.3$. In the region about $x=0.3$, the approximation is very accurate; however, when x moves further away from $x=0.3$, the approximation becomes very poor. In general, for the linearization of a complex physical system, the approximation is accurate near the selected operating point. Therefore the specification of the operating point directly determines the result given by linearization.

In some implementations a single linear approximation, e.g., approximation 410, may be used to represent a non-linear system. In other situations, two or more linear approximations may be used to represent portions of the nonlinear system. For example, approximation 410, approximation 420, and approximation 430 may be used to approximate nonlinear function 405 at three operating points. Controllers designed for these three operating points can be combined using gain scheduling techniques to arrive at an overall controller for the nonlinear system.

Exemplary Control Technique

Figure 5:
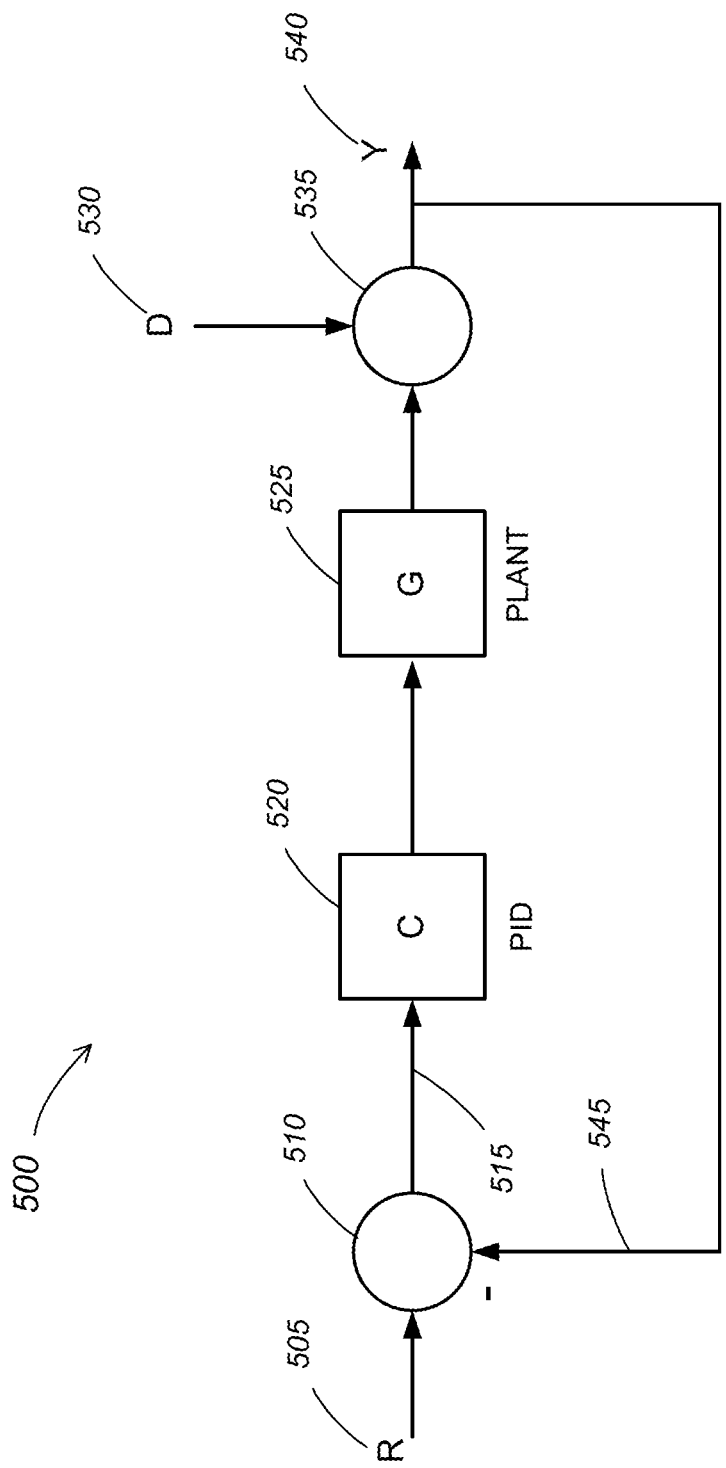
FIG. 5 illustrates a general representation of a model that can include a controller consistent with the principles of the invention.

A technique for implementing embodiments of the invention is provided below. A generalized representation of a system having a single-input single-output (SISO) feedback loop is illustrated in FIG. 5. For example, the system of FIG. 5 can be a generalized representation of the automobile cruise control system of FIG. 3. In FIG. 5, PID controller 520 can represent cruise control system 330 and plant 525 can represent automobile 350.

In the implementation of FIG. 5, plant 525 may be a linear, time invariant model, controller 520 may be a PID controller, signal R 505 may represent a reference signal, signal 515 may represent an error signal that can be represented as e=r−y, signal D 530 may represent an output disturbance that may be combined with the output of the plant by an add block 535, and signal Y 540 may represent an output, which may be returned to a subtract block 510, as indicated by a feedback loop 545.

When designing controller 520, a user may have objectives that controller 520 should achieve when operating with plant 525. For example, a user may specify a closed-loop stability, a zero steady-state error, a response time (e.g., that a response y to a step input r or d rises and settles within a determined interval), a robustness requirement (e.g., that a step response has small overshoot and the gain and phase margins are sufficiently large, such as 6 dB gain margin and 45 degrees phase margin).

A standard continuous-time PID controller having tunable parameters P, I, D, and N can be represented by:

$$C(s) = P + \frac{I}{s} + \frac{Ds}{1+s/N} \quad \text{(Eq. 1)}$$

A user applying conventional techniques to design a PID controller that meets design objectives, such as the ones identified above, may need to find P, I, D and N, where N represents the frequency range where the derivative term is active, or, in (1+s/N) form, it represents the pole location of the derivative filter. Determining four parameters for a controller may require computationally intensive searches of, for example, a four dimensional (4D) space. For example, searching a 4D space for P, I, D, and N, where each dimension includes 100 data search points, would require testing $100^4$ (100,000,000) data points. As a result, 4D searches may too slow to support interactive applications, such as an application that allows a user to interactively design a PID controller for a model.

Exemplary embodiments can facilitates rapid tuning of the PID parameters so that interactive PID design applications can be supported. In fact, embodiments can operate in real-time such that a user can modify an input and immediately (i.e., without a delay that inconveniences a typical user) see a display reflecting the modified controller. For example, in an embodiment $\omega_c$, which is the frequency where the gain of the open-loop response L=GC first crosses the 0 dB line, can be fixed. In the embodiment, w is directly related to the closed loop bandwidth, which is in turn directly related to the speed of response for the controller. The embodiment can also fix $\theta_m$, which is the desired phase margin at the crossover frequency. $\theta_m$ may also partially control the amount of overshoot associated with the controller. The embodiment can further allow for adjusting $\omega_c$ for a given phase margin target $\theta_m$, or for adjusting $\theta_m$ for a given crossover frequency target $\omega_c$.

Once $\omega_c$ and $\theta_m$ are selected, two remaining parameters for the PID controller can be tuned by parameterizing PIDs with a gain crossover frequency at $\omega_c$ and a phase margin $\theta_m$ at $\omega_c$. The parameterization can be written as:

$$C(s) = \frac{\omega_c}{s}\left(\frac{\sin\varphi_z s + \omega_c \cos\varphi_z}{\omega_c}\right)\left(\frac{\sin\beta s + \omega_c \cos\beta}{\sin\alpha s + \omega_c \cos\alpha}\right) \quad \text{(Eq. 2)}$$

where the angles $\varphi_z$, $\alpha$, and $\beta$ vary between 0 and 90 degrees. A total phase shift contributed by the PID at the frequency $\omega_c$ is given by:

$$\Delta\varphi=\varphi_z+\beta-\alpha \quad \text{(Eq. 3)}$$

Exemplary embodiments are adapted for implementing the disclosed control techniques in computing devices. These embodiments may require that equations be represented in discrete-time representations to implement the equations on a computing device. For example, the parameterization of Eq. 2 can be rewritten in a discrete-time representation as:

$$C(z) = \frac{2\sin\frac{\omega_c T_s}{2}}{z-1}\left(\frac{\sin\varphi_z z - \sin(\varphi_z - \omega_c T_s)}{\sin\omega_c T_s}\right)\left(\frac{\sin\beta z - \sin(\beta - \omega_c T_s)}{\sin\alpha z - \sin(\alpha - \omega_c T_s)}\right) \quad \text{(Eq. 4)}$$

where $T_s$ denotes the sampling time. In Eq. 4, the parameterization allows for PIDs with real zeros and free parameters that are the angles $\alpha$ and $\beta$. Still referring to Eq. 4, C is a product of three factors having unit gain at $\omega_c$, where the first factor is the integral action, the second factor captures the phase lead contributed by the P and I terms, and the third factor captures the additional phase lead contributed by the D and N terms. In Eq. 4, the third factor is a lead network with one real zero and one real pole when $0<\alpha<\beta<90$. The third factor can also contribute some phase lag when $\beta<\alpha$. In an embodiment, the third factor can be eliminated to produce a unique PI controller having a gain crossover at $\omega_c$ and a phase margin $\theta_m$ at $\omega_c$. Omitting the first factor yields a parameterization of PD controllers (no integral action), and omitting the second factor amounts to zeroing out the P term (proportional action). Consequently, the technique described herein can be used to tune any specialization of PIDN controllers, such as P, PI, PD, and ID.

Adequate values for $\alpha$ and $\beta$ can be selected for use with exemplary embodiments when certain conditions or assumptions are satisfied. For example, adequate values for $\alpha$ and $\beta$ can be selected when $\omega_c$ is the first gain crossover, a speed of response is a function of $\omega_c$, and $\omega_c$ is selected to meet performance goal objectives (e.g., closed-loop stability and adequate robustness).

When closed-loop stability and adequate robustness are used to select adequate values for $\alpha$ and $\beta$, practical difficulties can be encountered. For example, testing closed-loop stability can be computationally intensive (i.e., computationally expensive) when performed by explicitly computing the closed-loop poles. And, ranking the merit of each $\alpha$, $\beta$ design can be difficult because desired features (e.g., a small overshoot, absence of ringing, fast settling time, etc.) can be hard to quantify and/or may require computing closed-loop step responses, which are also typically computationally intensive operations.

An exemplary embodiment avoids shortcomings associated with conventional techniques by using frequency-domain information (e.g., the open-loop Bode response) to enforce selected design objectives and to produce consistent controller designs. One reason that exemplary embodiments can promptly evaluate $\alpha$, $\beta$ designs with respect to stability and robustness is that the open-loop Bode response used in exemplary embodiments is not computationally intensive (i.e., computationally inexpensive) to compute (e.g., as compared to computing closed-loop step responses, testing closed-loop stability, etc.). These computationally inexpensive calculations provide improved speed as compared to conventional techniques. These speed improvements allow exemplary embodiments to support typical user workflows, such as interactive PID evaluation and tuning operations in substantially real-time (e.g., without delays that inconvenience a typical user).

Exemplary embodiments can support interactive workflows by employing a technique that reinterprets the Nyquist criterion to assess closed-loop stability from the open-loop Bode response. For example, the Nyquist stability test can be characterized by letting:

L(s) be the open-loop transfer function and letting P be the number of unstable (right-half-plane) poles of L(s);

$\varphi(\omega)$ be any continuous representation of the phase of $L(j\omega)$ in radians;

$(\omega_0, \omega_1, \ldots, \omega_k)$ be the ordered set of gain crossover frequencies where $|L(j\omega)|=1$, with the convention that k is even when the gain of $L(j\omega)$ is decreasing at $\omega_k$ (i.e., the sequence starts at $\omega_1$ when the DC gain is less than 1);

$(\varphi_0, \varphi_1, \ldots, \varphi_k)$ be the values of $\varphi(\omega)$ at the frequencies $(\omega_0, \omega_1, \ldots, \omega_k)$;

$m_0$ and $m_\infty$ be the slopes of L(s) near 0 and infinity (e.g., $L(s)/s^{m_0}$ is finite as $s \to 0$);

$\delta_0$ be 1 if $|L(0)|>1$ and 0 otherwise; and $\delta_\infty$ be 1 if $|L(\infty)|>1$ and 0 otherwise.

When the above conditions are met, the closed-loop transfer function $1/(1+L(s))$ is stable if and only if $$2\left(\sum_k (-1)^k \mu(\varphi_k)\right) = P + \frac{\delta_0}{\pi}\left(\varphi(0) - m_0\frac{\pi}{2}\right) - \frac{\delta_\infty}{\pi}\left(\varphi(\infty) - m_\infty\frac{\pi}{2}\right) \quad \text{(Eq. 5)}$$

where $\mu(.)$ is the integer-valued function defined by:

$$\mu(\varphi)=k \Leftrightarrow \varphi \in [(2k-1)\pi, (2k+1)\pi] \quad \text{(Eq. 6)}$$

Eq. 5 provides a stability test in terms of the phase angles $(\varphi_0, \varphi_1, \ldots, \varphi_k)$ at the gain crossover frequencies $(\omega_0, \omega_1, \ldots, \omega_k)$. From the plant G and the choice of PID structure, the quantities on the right-hand side are known. Given this information, it can be ascertained that:

a. Since the left-hand side is always even, the right-hand side must be an even integer as well. When the left hand side evaluates to an odd number, stability can be recovered by switching the feedback sign when $\delta_0$ and $\delta_\infty$ are distinct. Otherwise there is no stabilizing PID;

b. When 2r is the value of the right-hand side after the adjustment, then the stability condition is:

$$\Sigma_k(-1)^k \mu(\varphi_k)=r \quad \text{(Eq. 7)}$$

c. When there is a single gain crossover frequency, $\omega_0$, then $\mu(\varphi_0)=r$, which indicates that the open-loop phase angle $\omega(\omega_0)$ must lie in the interval $[(2r-1)\pi, (2r+1)\pi]$. When the phase margin requirement is accounted for, this interval further reduces to $[(2r-1)\pi+\theta_m, (2r+1)\pi-\theta_m]$.

d. When there are multiple gain crossover frequencies, $\omega_0, \ldots \omega_{2m-1}, \omega_{2m}$, there are an infinite number of ways to satisfy the equation:

$$\Sigma k(-1)^k \mu(\varphi_k)=r \quad \text{(Eq. 8), and}$$

e. In practice it can generally be assumed that additional pairs of crossover frequencies $\omega_{2k-1}, \omega_{2k}$ do not contribute to closed-loop stability, that is, $\mu(\varphi_{2k-1})=\mu(\varphi_{2k})$.

In typical control systems, stability can be enforced by low-frequency actuation rather than high-frequency actuation. With this restriction, a sufficient condition for stability in the multiple-crossover case is that: (1) the open-loop phase angle $\varphi(\omega_0)$ at the first crossover $\omega_0$ should lie in the interval $[(2r-1)\pi, (2r+1)\pi]$, and (2) for subsequent pairs of crossovers $\omega_{2k-1}$, $\omega_{2k}$, the phase angles should satisfy $\mu(\varphi_{2k-1})=\mu(\varphi_{2k})$. Equivalently, there should be no (net) 180-degree phase crossings where the loop gain is greater than 1.

Exemplary embodiments can include a technique for assessing closed-loop stability and the phase margin requirement $\theta_m$. This technique can be performed by computing the integer r, which may only be performed once; and, computing the gain and unwrapped phase of the plant G over some adequate frequency grid $\omega_G$, which may also be performed once. Then for candidate PID controllers, the technique may:

a. compute the open-loop magnitude and phase $\varphi(\omega)$ by superimposing the controller contribution to the plant gain and phase;

b. locate the gain crossover frequencies $\omega_0, \ldots, \omega_{2m-1}$, $\omega_{2m}$ and compute the corresponding phase values $\varphi_0, \ldots, \varphi_{2m-1}, \varphi_{2m}$ using linear interpolation on the grid $\omega_G$;

c. confirm that $\varphi_G$ lies in the interval $[(2r-1)\pi+\theta_m,(2r+1)\pi-\theta_m]$;

d. confirm that $\mu(\varphi_{2k-1})=\mu(\varphi_{2k})$ for k=1, ..., m; and e. confirm that the phase margin is at least $\theta_m$ at the additional crossover frequencies $\omega_1, \omega_2, \ldots, \omega_{2m-1}$, $\omega_{2m}$.

The above test for candidate PID controllers may involve operations on vectors commensurate with $\omega_G$. In many instances, these vectors can consist of a few hundred points, which allows the test to be performed rapidly in computing environments, such as time-based free-form modeling environments (e.g., a Simulink modeling environment). For example, in one implementation, the test can quickly run in a technical computing environment, such as a MATLAB computing environment or a MATLAB-compatible computing environment, such that interactive controller design activities are supported by exemplary embodiments.

From the Nyquist Stability Test discussed above, the open-loop phase $\omega_0$ at the first crossover $\omega_0$ should lie in the interval $[(2r-1)\pi+\theta_m, (2r-1)\pi-\theta_m]$. Assuming a plant having a phase $\varphi_G(\omega_0)$ and a PID that can change the phase by at most 90 degrees, three situations may occur:

(1) The PID can't move the phase into the desired range. This presents a situation where the crossover frequency $\omega_0$ is not admissible;

(2) $\varphi_G(\omega_0)-90$ is already in the required interval. In this situation the minimum phase lead needed from the second PID factors is $\Delta\varphi=0$; and (3) $\varphi_G(\omega_0)-90$ is outside the required interval. In this situation the PID controller must supply some nonzero phase lead $\Delta\varphi$.

When given $\Delta\varphi$, free parameters $\alpha$ and $\beta$ need to be selected so as to satisfy the Nyquist Stability Test and/or to maximize robustness and design merit. By applying the constraints $0<\alpha<\beta<90$ and $\Delta\varphi-90<\beta-\alpha$, a 2D range is delimited that can be coarsely gridded to home in on $(\alpha,\beta)$ combinations that can include a best $(\alpha,\beta)$ combination for a particular application. Exemplary embodiments can use one or more merit functions to rank the robustness and quality of $(\alpha,\beta)$ designs. For example, an embodiment may rank the robustness and quality of each $(\alpha, \beta)$ design according to one or more determined criteria.

Exemplary techniques disclosed herein can employ a composite merit function involving the sensitivity and complementary functions $S=1/(1+GC)$ and $T=GC/(1+GC)$. Because $|1+GC(j\omega)|$ is the distance of the open-loop response to the critical point $(-1,0)$, the size of $|S(j\omega)|$ provides a measure of how close $L(j\omega)$ gets to the critical point and the robustness of the feedback loop. Similarly, how large $|T(j\omega)|$ gets is related to how much overshoot is present in the closed-loop response. When employing techniques disclosed herein, it may be desirable to have the magnitude of S and T remain close to the ideal values:

$$|S(j\omega)| = \left|\frac{j\omega}{j\omega+\omega_0}\right|, |T(j\omega)| = \left|\frac{\omega_0}{j\omega+\omega_0}\right| \quad \text{(Eq. 9)}$$

The values of Eq. 9 can correspond to the situation when open loop is a pure integrator: $L(s)=\omega_0/s$. In particular, the gain $|T(j\omega)|$ should be close to 1 in the frequency range from 0 up to the vicinity of $\omega_0$. A gain greater than 1 can create overshoot and a gain less than 1 introduces slow dynamics and sluggish settling. Still referring to Eq. 9, the gain $|T(j\omega)|$ should roll off past $\omega_0$. When the gain value approaches 1 at some frequency $\omega \gg \omega_0$, the closed-loop response will likely exhibit ringing at this frequency.

Exemplary embodiments can employ merit functions to balance design objectives associated with, for example, PID controllers used to support interactive modeling applications. Appropriate merit functions can facilitate development of designs that satisfy the design objectives. An exemplary merit function that can be used with an embodiment can be written as:

$$F=\max_\omega \max(|S(j\omega)|-2,|T(j\omega)|-T_{max},T_{min}-|T(j\omega)|) \quad \text{(Eq. 10)}$$

where the lower and upper bounds $T_{min}$ and $T_{max}$ are chosen as:

$$T_{min}(\omega) = \frac{1}{\max(1,\omega/(\omega_0/1.5))}, T_{max}(\omega) = \frac{1}{\max(1,\omega/(1.5\omega_0))} \quad \text{(Eq. 11)}$$

Figure 6:
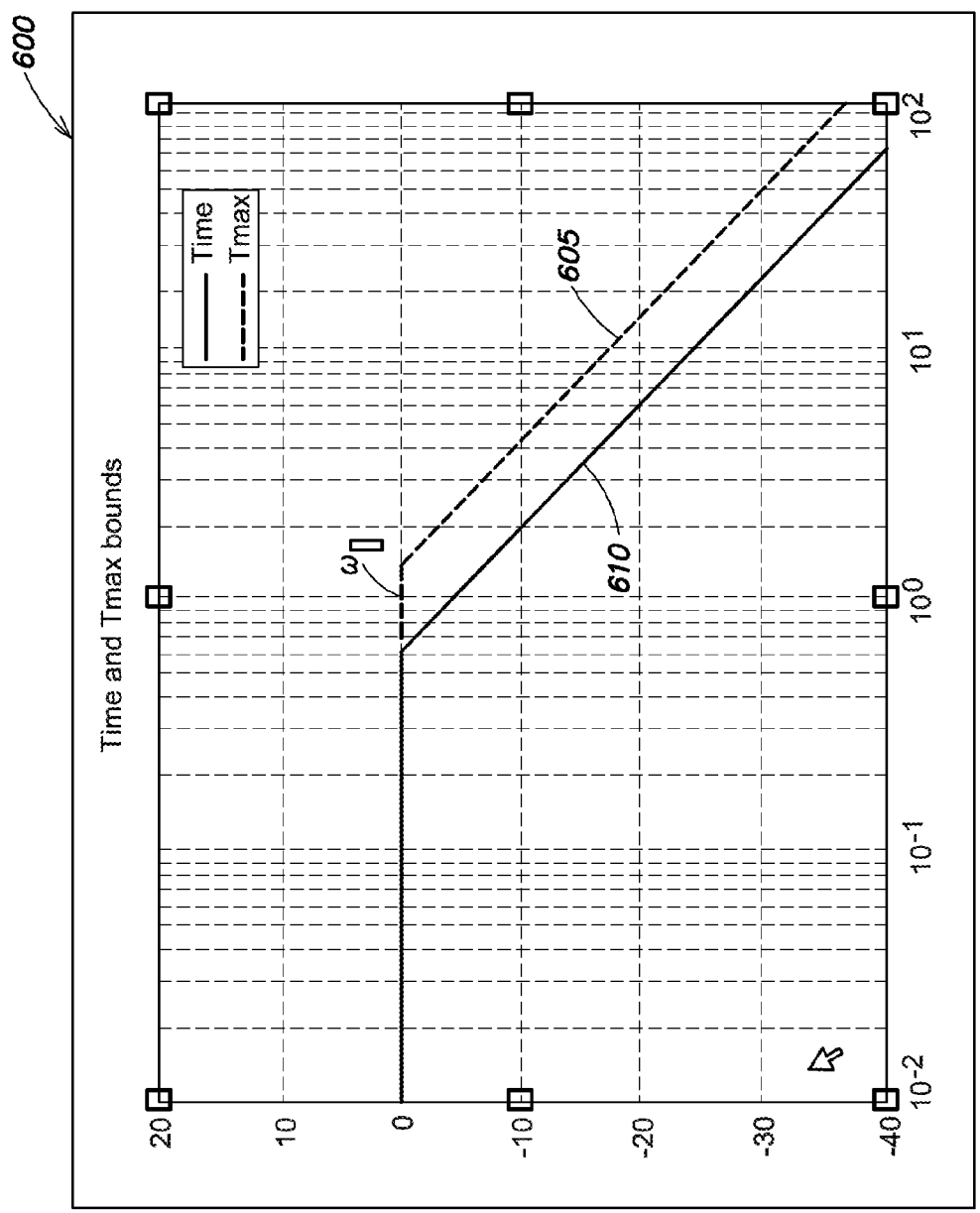
FIG. 6 illustrates an exemplary gain template that can be used with a technique for designing a controller.

FIG. 6 illustrates gain templates for $T_{min}(\omega)$ and $T_{max}(\omega)$ of Eq. 11, above. Referring to FIG. 6, $T_{max}(\omega)$ is represented by trace 605 and $T_{min}(\omega)$ is represented by trace 610.

Referring back to Eq. 10, angles $\alpha$ and $\beta$ are selected so as to minimize the merit function F subject to passing the Nyquist Stability Test. Satisfactory tuning can generally be achieved when values of F are smaller than 0.1. Exemplary embodiments can make use of techniques that search for an optimal $(\alpha,\beta)$ combination. Examples of search techniques include, but are not limited to, brute-force gridding, direct search, or gradient-descent techniques.

An exemplary embodiment can produce satisfactory results using a coarse gridding technique that grids the $(\alpha, \beta)$ range $[0,45]\times[45,90]$ by increments of 5 degrees (total of 100 points), discards points $(\alpha,\beta)$ that violate the constraints $\Delta\varphi-90<\beta-\alpha$ or that fail the Nyquist Stability Test. The gridding technique can then evaluate the merit function F at the remaining points, selecting the point that yields the smallest value of F, where this smallest value is referred to as $F_{min}$.

The $F_{min}$ value for a given crossover frequency $\omega_0$ is indicative of the viability of PIDs with the corresponding bandwidth. When $F_{min}$ is much larger than 0.1, the PID may exhibit poor performance/robustness. In this situation, the crossover frequency $\omega_0$ may need to be adjusted. In some situations, a crude search in the vicinity of the target frequency (based on the plant natural frequency $\omega_T$) is generally enough to fix the performance/robustness problem. For example, can be computed for 10 candidate crossover frequencies spanning the interval [0.01 $\omega_T$, 100 $\omega_T$]. Then, a crossover frequency closest to $\omega_T$ with an acceptable $F_{min}$ value may be selected.

Exemplary User Interfaces

User interfaces described below can use algorithms discussed above to provide fast, interactive workflows to users. These fast, interactive workflows are supported due to the speed of the control algorithm and by allowing users to specify characteristics of PID controllers using terms familiar to a typical user.

Figure 7:
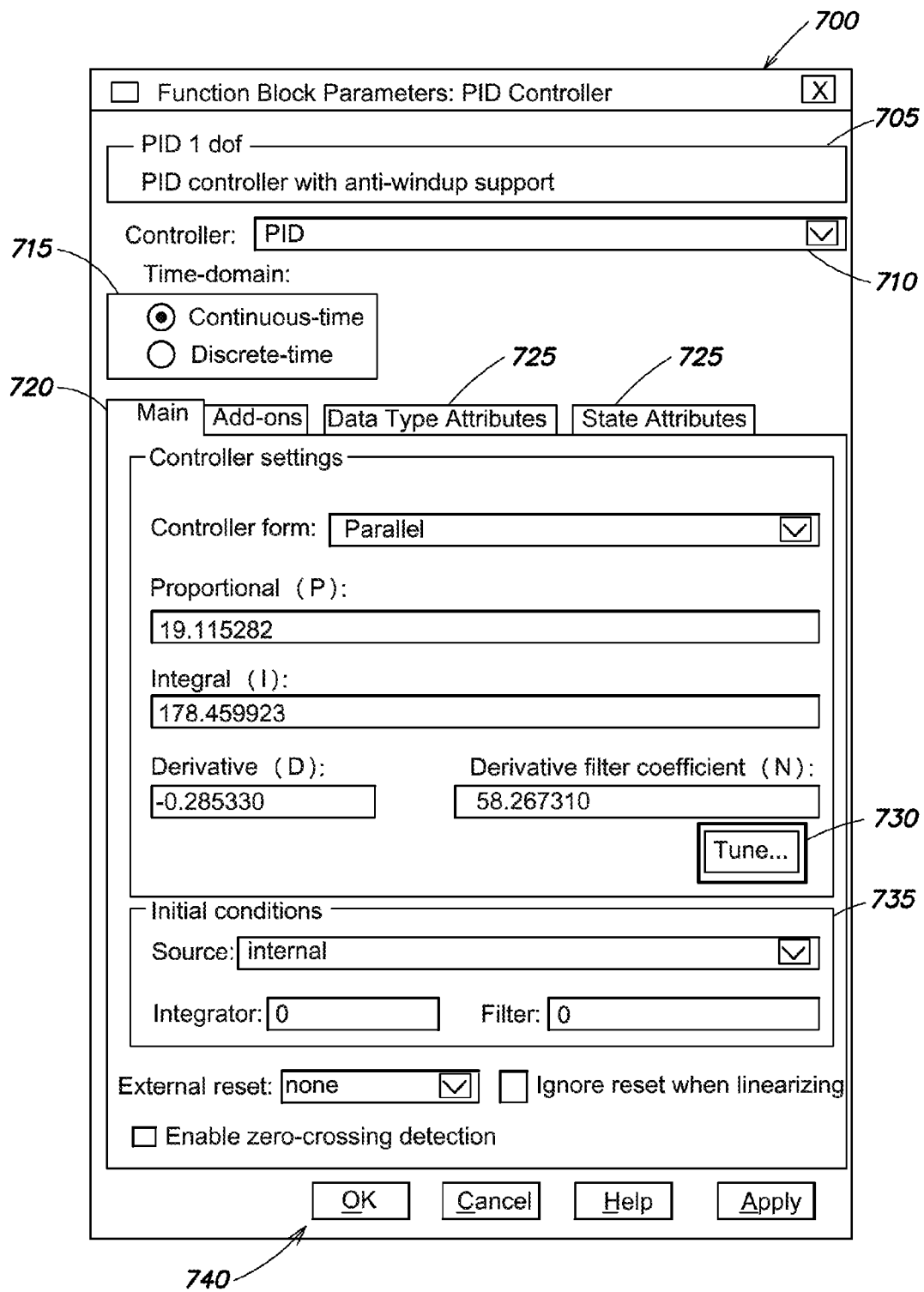
FIG. 7 illustrates an exemplary user interface for selecting a PID controller.

FIG. 7 illustrates an exemplary user interface for specifying a PID controller. In an embodiment, modeling environment 120 may provide user interface 700 to a user via controller logic 250. For example, the user may be working in model representation 160 and may wish to create a PID controller for use with a model of a system, such as plant 170. The user may select an icon using a pointing device and interface 700 may be provided to the user via display device 150.

Interface 700 may include an identifier 705 that provides information about the PID controller that the user is creating. In an embodiment, a user may select, e.g., by double clicking, cruise control system 330 and interface 700 may appear on display device 150. Other embodiments can include a plurality of interfaces 700 where each instance of interface 700 is associated with a controller in a model that includes a plurality of controllers.

Referring to FIG. 7, selection field 710 may allow the user to select a controller type, such as a PID controller, a PI controller, etc. Domain field 715 may allow a user to select whether the controller is a continuous time controller or a discrete time controller. Interface 700 may include one or more pages 720 for displaying and/or receiving information about settings for a controller. For example, an active page may be displayed in the foreground and may provide information to the user about coefficients for P, I, and D, a form for the controller (e.g., parallel), and filter coefficients for a specified derivative filter. Interface 700 may include other pages that are not active and these pages may be identified using tabs 725. A user may select a tab 725 to make a page related to the tab active.

Interface 700 may also include a tuning button 730 that causes a controller to be tuned using information in interface 700 and/or information available in a model to which the controller is connected. In an embodiment, tuning button 730 may be selected, and gains for P, I, and D may be automatically generated using computer 105. For example, in an embodiment the gains may be generated using a default design performance specification. The embodiment may further open interface 700 based on an initial design using the default design performance specification. Tuning button 730 may further cause a controller design algorithm to automatically linearize a model connected to an input and an output of controller block 330. In an embodiment, an entire model can be linearized when tune button 730 is selected. In FIG. 3, selecting tune button 730 may result in a linear model of automobile 350 multiplied by −1 due to summation block (+ and −) in FIG. 3.

Initial conditions field 735 may provide information about a source (e.g., internal or external), an integrator, and/or a filter. Interface 700 may also include buttons 740 to store information in interface 700, close interface 700, cancel user selections from interface 700, provide help to a user regarding interface 700 and/or apply information displayed via interface 700 to a model.

Figure 8:
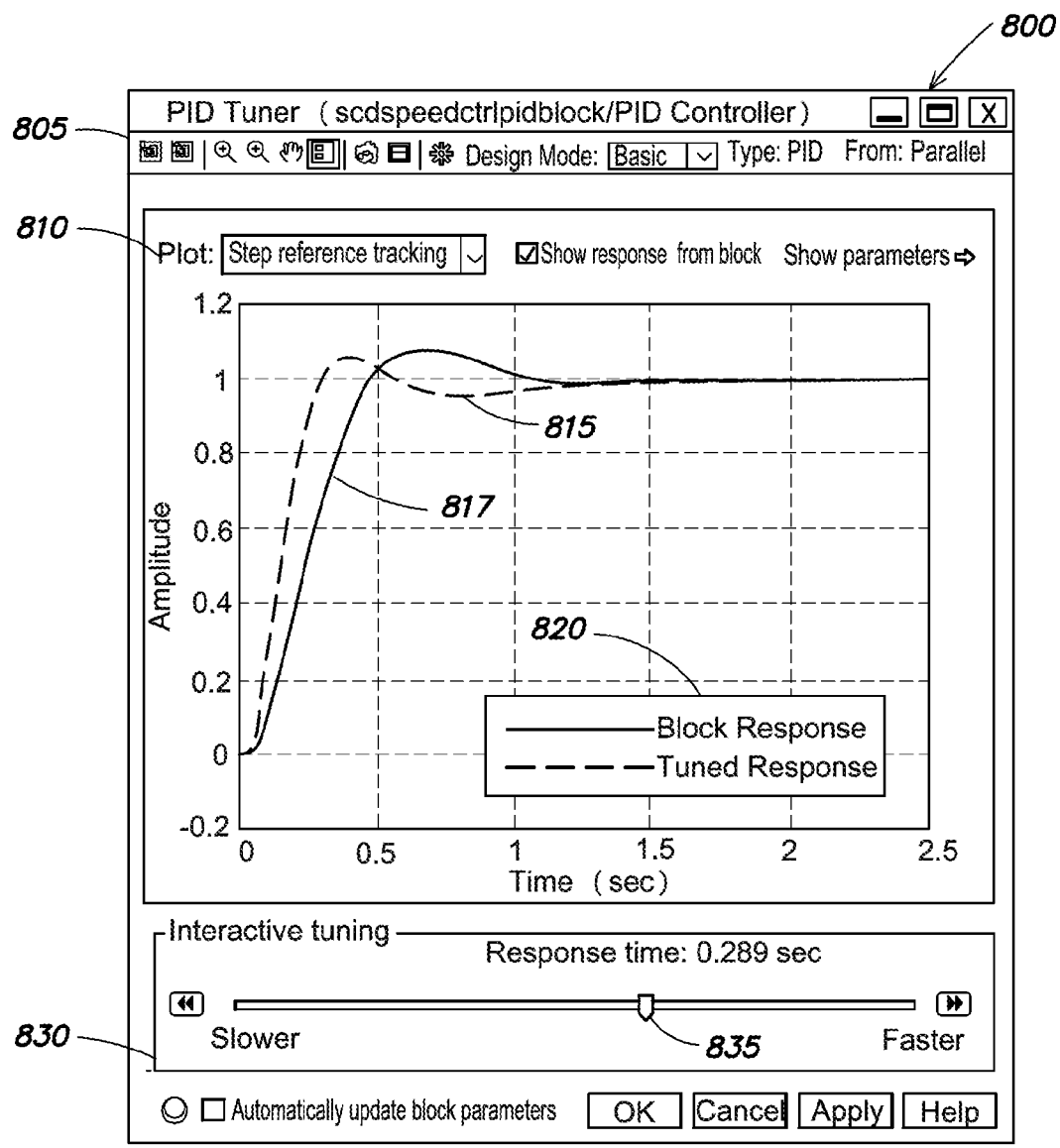
FIG. 8 illustrates an exemplary user interface for tuning the response of a PID controller.

FIG. 8 illustrates an exemplary user interface for tuning the response of a PID controller. Interface 800 may be used to display information about a response of a controller and to receive user inputs related to the controller. In an embodiment, interface 800 may include toolbar 805 that can include icons representing actions that a user can select. For example, a zoom icon may allow the user to zoom into a portion of a plot related to the controller.

Plot region 810 may include information about transfer functions 815 and 817 for the closed loop system. For example, plot region 810 may display a plot of amplitude versus time for a block response (trace 817) or tuned response (trace 815). Legend 820 may provide a user with descriptions about traces 815 and 817. Design region 830 may include user manipulated mechanisms that can change characteristics of a controller. For example, design region 830 may include a slider 835 that can be manipulated to increase or decrease a response speed for a controller. In an embodiment, controller logic 250 may establish an initial position for the slider (e.g., midway between a minimum value and maximum value) and a user may move the slider from the initial position if desired. In an embodiment, transfer function 815 may change in real-time when a user moves slider 835.

Interfaces used with exemplary embodiments may be configured to allow users to modify one or more parameters for a controller. For example, interface 800 includes a single slider 835 that allows the user to modify a response speed for a controller. Other embodiments may allow a user to modify other parameters alone or in combination with a response speed or other type of parameter.

Figure 9A:
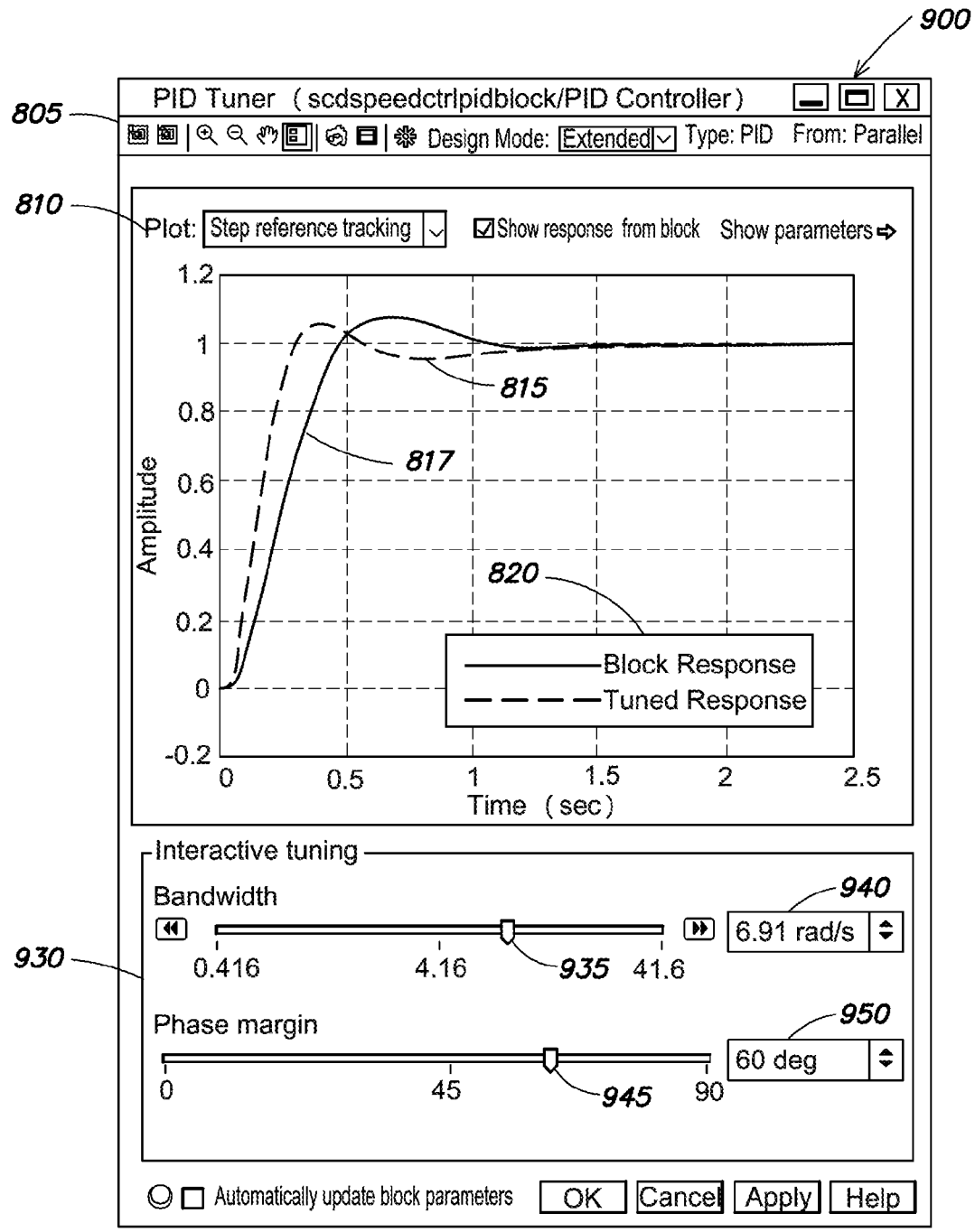
FIGS. 9A and 9B illustrate exemplary user interfaces for tuning the response of PID controllers.

FIG. 9A illustrates an exemplary user interface for tuning the response of a PID controller. The user interface of FIG. 9A may be a more advanced interface for designing controllers as compared to the interface of FIG. 8. Interface 900 may be used to tune a controller using two parameters, such as a closed-loop bandwidth and a phase margin. Interface 900 may include features discussed in connection with interface 700 or 800 and may further include design region 930.

Design region 930 may include two or more user manipulated input mechanisms to modify parameters for a controller. For example, a first slider 935 may be used to modify a closed loop bandwidth for a PID controller, and a second slider 945 may be used to modify a phase margin for the PID controller. Design region 930 may further include a first readout 940 for displaying numerical information related to the closed loop bandwidth and a second readout 950 for displaying information about the phase margin.

Figure 9B:
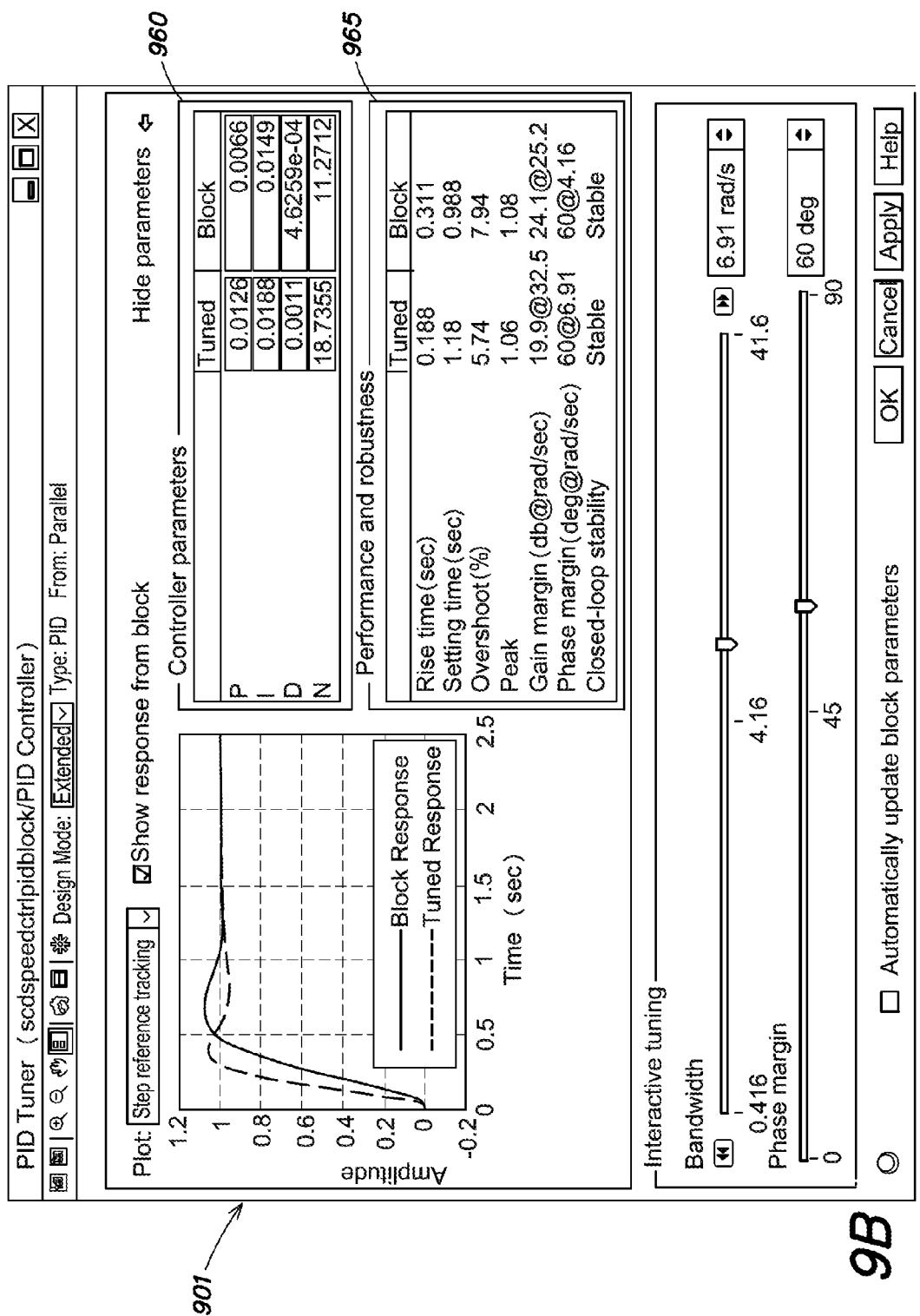

FIG. 9B illustrates an alternative implementation of interface 900, which is denoted as interface 901. Interface 901 can be configured to display designed PID parameters, such as P, I, D, and N values as well as one or more performance and robustness measurements, such as settling time, overshoot, etc. For example, controller parameters can be displayed in region 960 and performance and robustness metrics can be displayed in region 965.

Other embodiments of user interfaces used with PID controllers and control techniques described herein can be configured in ways that are different from the configurations illustrated in FIGS. 7, 8, 9A and 9B. These other configurations can include more features or fewer features than the illustrated embodiments without departing from the spirit of the invention.

Exemplary Processing

Exemplary processing acts can make use of control algorithms discussed herein to provide users with a fast, interactive environment for designing controllers.

Figure 10A:
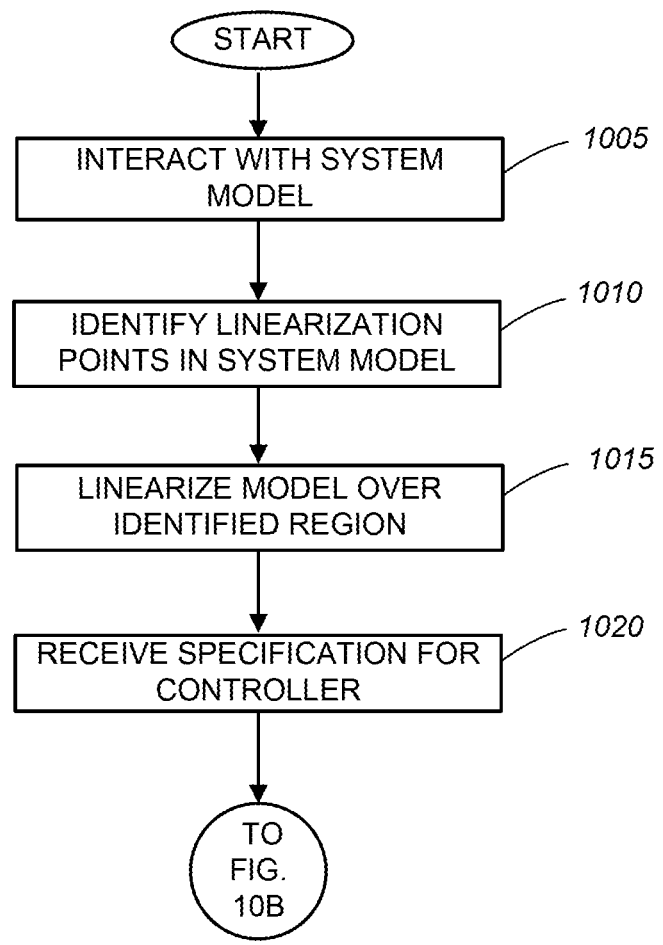
FIGS. 10A and 10B illustrate exemplary processing that can be used to implement an embodiment of the invention.
Figure 10B:
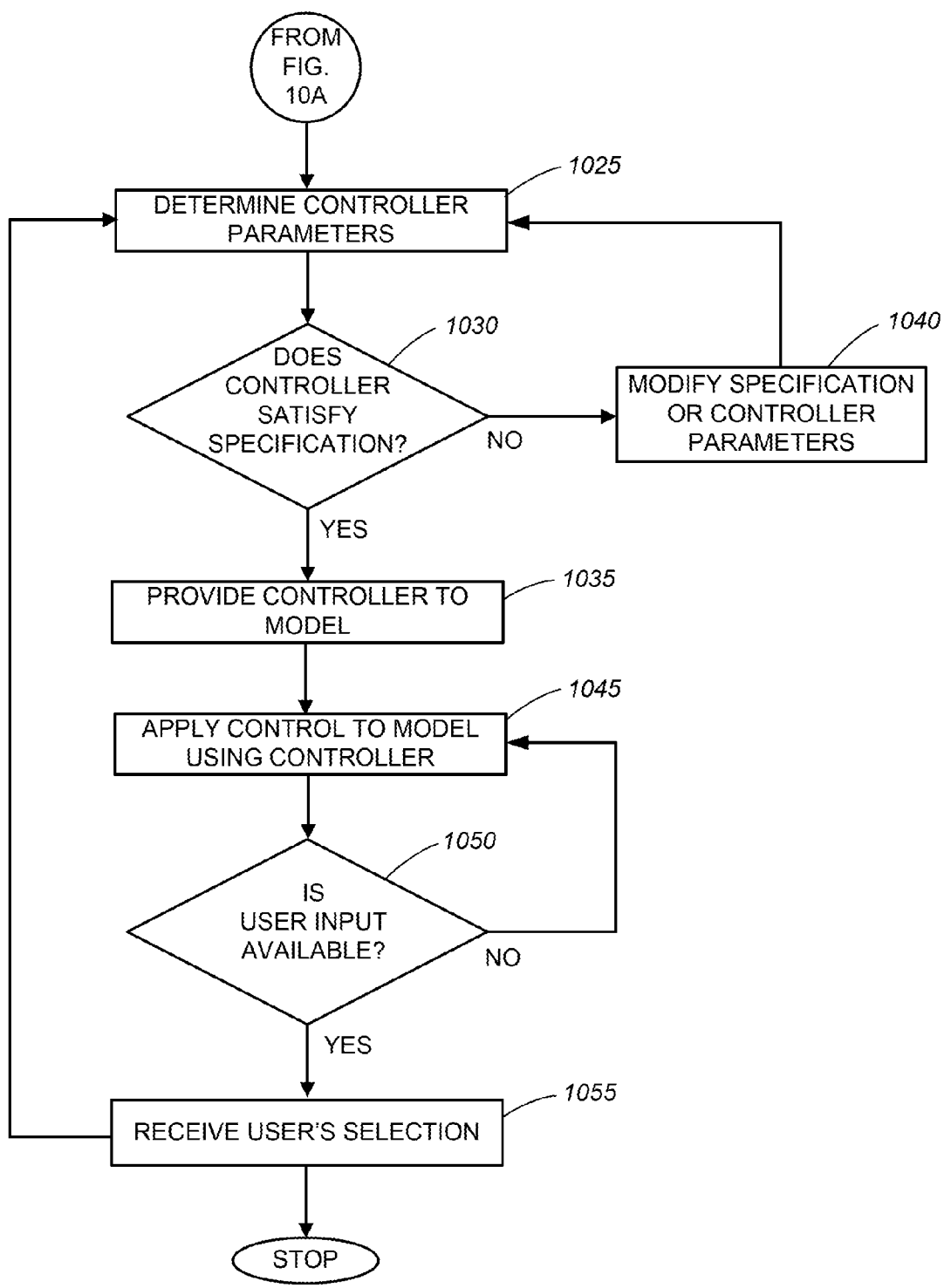

FIGS. 10A and 10B illustrate exemplary processing that can be used for practicing embodiments of the invention. Embodiments described herein can be used to allow users to develop and implement controllers in a way that is consistent with typical workflows experienced by the user. For example, a user may interact with a free-form modeling environment in a typical manner. The user may also think of operating characteristics for controller in a typical manner, such as speed of response, phase margin, closed-loop response, closed-loop bandwidth, etc. Embodiments allow the user to maintain the typical workflows while also allowing the user to interactively design and implement controllers, such as PID controllers, in the model using operating characteristics familiar to the user.

Referring to FIG. 10A, an embodiment of the invention may interact with a system model that will be controlled using a controller (act 1005). For example, a user may develop a model of a system that needs to be controlled to allow the system to operate in a desired manner. The user may plan to deploy one or more controllers in the model to achieve the desired operation.

The user may identify points (locations) in the model, where the points determine a region of the model that will be linearized to form a LTI model (act 1010). The identified region of the model is linearized to form a LTI model (act 1015). Once a region of the model is linearized, a specification for a controller that will be used with the LTI model may be received (act 1020).

For example, a user may select a controller block for the model and may deposit the block in the model. A dialog window may open for the controller block and may allow the user to enter specifications for a controller that will be used to control the LTI portion of the model. For example, a user may specify desired response speed for the controller, a phase margin for the controller, a closed-loop response for the controller, and/or a closed-loop bandwidth for the controller.

Referring now to FIG. 10B, the specifications received from the user may be used to determine parameters for a controller (act 1025). In an embodiment, the control technique described in connection with FIGS. 5 and 6 may be used to determine the controller parameters. Embodiments may automatically determine controller parameters based on the user input. In some embodiments, a determination may be made as to whether the controller satisfies the specification(s) entered by the user (act 1030). For example, a user may have specified a particular response speed for a controller, and in act 1030 computer 105 may determine whether the controller can satisfy the response speed requirement.

When the controller does satisfy the specification(s), a controller satisfying the specification(s) may be provided to the model (act 1035). In contrast, when computer 105 determines that the controller does not satisfy a specification, computer 105 may modify aspects of the specification(s) or parameters for the controller (act 1040). When computer 105 modifies specification(s) or parameters, computer 105 may attempt to design a controller that comes as close as reasonably possible to achieving the specification(s). In an embodiment, the user may be notified that a requested specification could not be met; and, therefore, had to be modified to design an adequate controller.

After act 1035, a controller satisfying the specification(s) may be applied to the LTI portion of the model (act 1045). The controller may control the LTI portion of the model when the model executes. Exemplary embodiments may allow a user to adjust parameters for the controller when the controller is in the model. For example, user interfaces, such as the ones illustrated in FIGS. 8 and 9A and B, can be used to adjust parameters of the controller using characteristics that are intuitive to a typical user. For example, the user can increase a response speed for the controller by moving a slider using a pointing device. Movement of the slider may cause parameters for a PID controller to be automatically tuned to produce an updated controller.

An exemplary embodiment may poll for user inputs and may determine whether a user input is available (act 1050). When a user input is detected, the user's selection may be received (act 1055) and may be used in act 1025 to recomputed parameters for the controller. When user inputs are not available, an existing controller may continue to be applied to the model as is done in act 1045.

Exemplary Architecture

Figure 11:
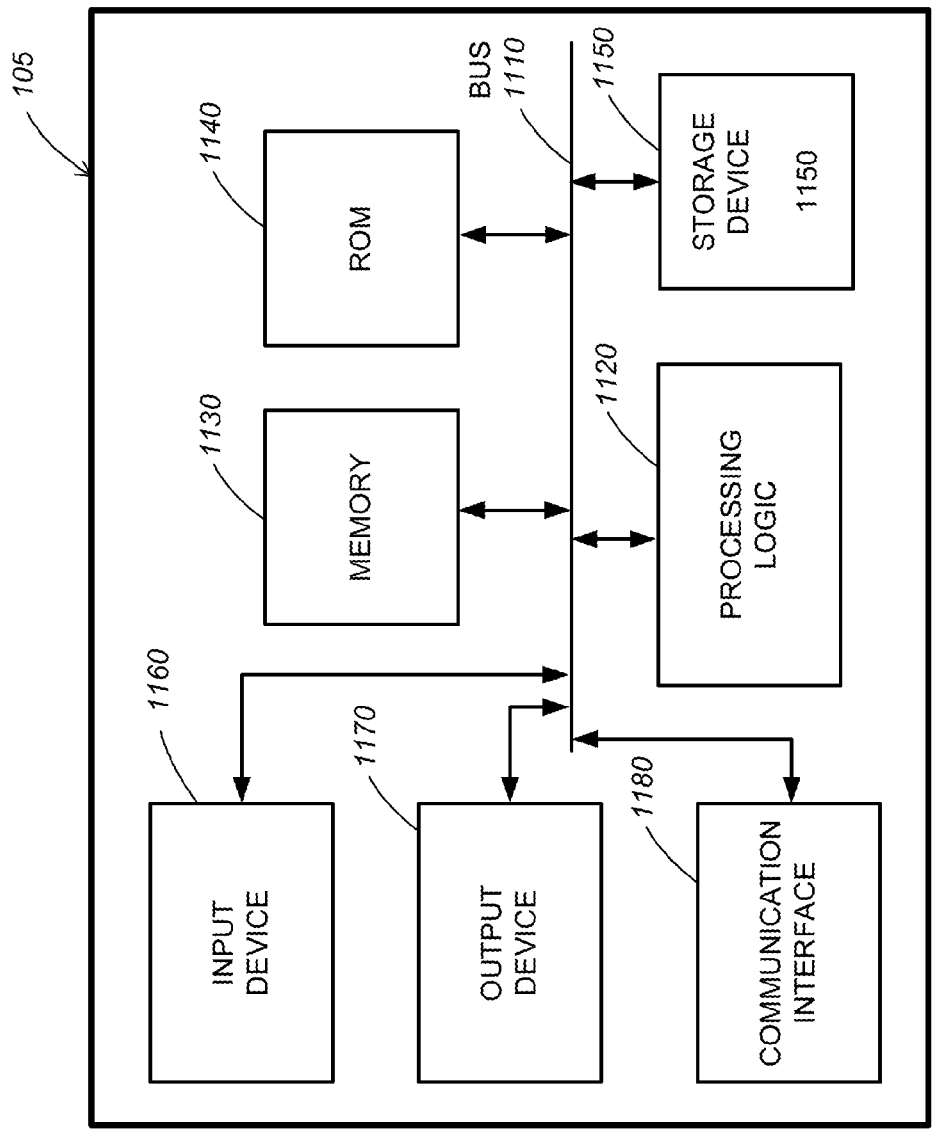
FIG. 11 illustrates an exemplary architecture for implementing an embodiment of the invention.

FIG. 11 illustrates an exemplary computer architecture that can be used to implement computer 105 of FIG. 1. FIG. 11 is an exemplary diagram of an entity corresponding to computer 105. As illustrated, the entity may include a bus 1110, processing logic 1120, a main memory 1130, a read-only memory (ROM) 1140, a storage device 1150, an input device 1160, an output device 1170, and/or a communication interface 1180. Bus 1110 may include a path that permits communication among the components of the entity.

Processing logic 1120 may include a processor, microprocessor, or other types of processing logic (e.g., field programmable gate array (FPGA), graphics processing unit (GPU), digital signal processor (DSP), application specific integrated circuit (ASIC), etc.) that may interpret and execute instructions. For an implementation, processing logic 1120 may include a single core processor or a multi-core processor. In another implementation, processing logic 1120 may include a single processing device or a group of processing devices, such as a processing cluster or computing grid. In still another implementation, processing logic 1120 may include multiple processors that may be local or remote with respect each other, and may use one or more threads while processing.

Main memory 1130 may include a random access memory (RAM) or another type of dynamic storage device that may store information and instructions for execution by processing logic 1120. ROM 1140 may include a ROM device or another type of static storage device that may store static information and/or instructions for use by processing logic 1120. Storage device 1150 may include a magnetic, solid state and/or optical recording medium and its corresponding drive, or another type of static storage device that may store static information and/or instructions for use by processing logic 1120.

Input device 1160 may include logic that permits an operator to input information to the entity, such as a keyboard, a mouse, a pen, a touchpad, an accelerometer, a microphone, voice recognition, camera, biometric mechanisms, etc. In an embodiment, input device 1160 may correspond to input device 140.

Output device 1170 may include a mechanism that outputs information to the operator, including a display, a printer, a speaker, a haptic interface, etc. Communication interface 1180 may include any transceiver-like logic that enables the entity to communicate with other devices and/or systems. For example, communication interface 1180 may include mechanisms for communicating with another device or system via a network.

The entity depicted in FIG. 11 may perform certain operations in response to processing logic 1120 executing software instructions stored in a computer-readable storage medium, such as main memory 1130. A computer-readable storage medium may be defined as a physical (e.g., tangible) or logical memory device. The software instructions may be read into main memory 1130 from another computer-readable storage medium, such as storage device 1150, or from another device via communication interface 1180. The software instructions contained in main memory 1130 may cause processing logic 1120 to perform techniques described herein when the software instructions are executed on processing logic. Alternatively, hardwired circuitry may be used in place of or in combination with software instructions to implement techniques described herein. Thus, implementations described herein are not limited to any specific combination of hardware circuitry and software.

Although FIG. 11 shows exemplary components of the entity, in other implementations, the entity may contain fewer, different, or additional components than depicted in FIG. 11. In still other implementations, one or more components of the entity may perform one or more tasks described as being performed by one or more other components of the entity.

Exemplary Distributed Embodiment

Distributed embodiments may perform processing using two or more processing resources. For example, embodiments can perform processing using two or more cores in a single processing device, distribute processing across multiple processing devices installed within a single enclosure, and/or distribute processing across multiple types of processing logic connected by a network.

Figure 12:
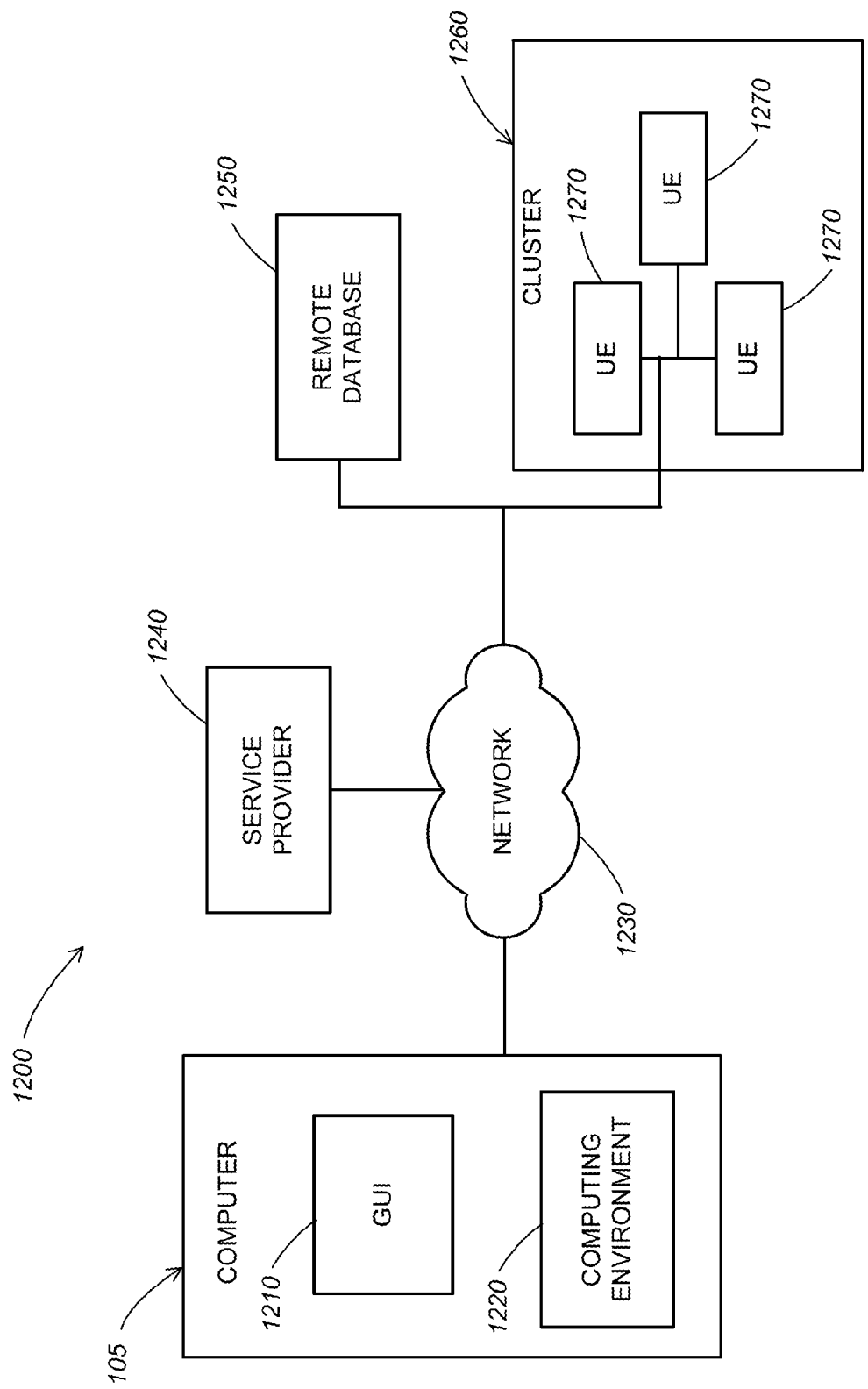
FIG. 12 illustrates an exemplary distributed embodiment for interactively designing and implementing controllers in free-form models.

FIG. 12 illustrates an exemplary system that can support interactively designing controllers for non-linear models on behalf of a client device (e.g., computer 105) using a distributed computing environment. System 1200 may include computer 105, network 1230, service provider 1240, remote database 1250 and cluster 1260. The implementation of FIG. 12 is exemplary and other distributed implementations of the invention may include more devices and/or entities, fewer devices and/or entities, and/or devices/entities in configurations that differ from the exemplary configuration of FIG. 12.

Computer 105 may include graphical user interface (GUI) 1210 and modeling environment 120. GUI 1210 may include an interface that allows a user to interact with computer 105 and/or remote devices (e.g., service provider 1240). In an exemplary embodiment, GUI 1210 may be similar to the interfaces of FIGS. 7, 8, 9A and 9B.

Network 1230 may include any network capable of transferring data (e.g., packet data or non-packet data). Implementations of network 1230 may include local area networks (LANs), metropolitan area networks (MANs) and/or wide area networks (WANs), such as the Internet, that may operate using substantially any network protocol, such as Internet protocol (IP), asynchronous transfer mode (ATM), synchronous optical network (SONET), user datagram protocol (UDP), IEEE 802.10, etc.

Network 1230 may include network devices, such as routers, switches, firewalls, and/or servers (not shown). Network 1230 may be a hardwired network using wired conductors and/or optical fibers and/or may be a wireless network using free-space optical, radio frequency (RF), and/or acoustic transmission paths. In an implementation, network 1230 may be a substantially open public network, such as the Internet. In another implementation, network 1230 may be a more restricted network, such as a corporate virtual network. Implementations of networks and/or devices operating on networks described herein are not limited to any particular data type, protocol, architecture/configuration, etc. For example, in an embodiment, network 1230 may be a quantum network that uses quantum-compatible networking protocols.

Service provider 1240 may include a device that makes a service available to another device. For example, service provider 1240 may include an entity that provides one or more services to a destination using a server and/or other devices. Services may include instructions that are executed by a destination to perform an operation. Alternatively, a service may include instructions that are executed on behalf of a destination to perform an operation on the destination's behalf.

Assume, for sake of example, that a service provider operates a web server that provides one or more web-based services to a destination, such as computer 105. The web-based services may allow computer 105 to perform distributed simulations of electrical and/or mechanical systems using hardware that is operated by the service provider. For example, a user of computer 105 may be allowed to interactively design PID controllers for system models using the service provider's hardware. In an implementation, a customer (user) may receive services on a subscription basis. A subscription may include an arrangement, such as a monthly subscription, a per-use fee, a fee based on an amount of information exchanged between service provider 1240 and the customer, a fee based on a number of processor cycles used by the customer, a fee based on a number of processors used by the customer, etc.

Remote database 1250 may include a device that stores machine-readable information for use by other devices, such as computer 105. In an embodiment, remote database 1250 may include an array or grid of storage devices (e.g., hard disks, optical disks, solid-state storage devices, etc.) that store data structures containing information about system models, controllers, etc.

Cluster 1260 may include a group of processing devices, such as units of execution 1270 that can be used to perform remote processing (e.g., distributed processing, parallel processing, etc.). Units of execution 1270 may include hardware and/or hardware/software based devices that perform processing operations on behalf of a requesting device, such as computer 105. In an embodiment, units of execution 1270 may each compute a partial result and the partial results can be combined into an overall result for a model.

Embodiments operating in a standalone or in a distributed implementation can perform activities described herein on code associated with text-based computing and/or modeling applications, such as, but not limited to, MATLAB® by The MathWorks, Inc.; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; or Modelica or Dymola from Dynasim.

Embodiments can further perform activities described herein on code associated with graphical modeling environments, such as, but not limited to, Simulink®, Stateflow®, SimEvents™, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhapsody or Tau from International Business Machines (IBM) Corporation; Ptolemy from the University of California at Berkeley; ASCET, CoWare, or aspects of a Unified Modeling Language (UML) or SysML environment. Graphical modeling environments can include block diagrams and/or other types of diagrams.

Embodiments may be implemented in a variety computing environments, such as a technical computing environment that support statically or dynamically typed programming languages. For example, a dynamically typed language may be one used to express problems and/or solutions in mathematical notations familiar to those of skill in the relevant arts. For example, the dynamically typed language may use an array as a basic element, where the array may not require dimensioning. These arrays may be used to support array programming in that operations can apply to an entire set of values, such as values in an array. Array programming may allow array based operations to be treated as a high-level programming technique or model that lets a programmer think and operate on whole aggregations of data without having to resort to explicit loops of individual non-array, i.e., scalar operations. An exemplary embodiment that uses a dynamically typed language may be implemented in the Embedded MATLAB programming language that can be used to create code for use in embedded applications.

Exemplary Embodiments

In an embodiment, one or more computer-readable media can hold one or more executable instructions that when executed on processing logic determine parameters for a proportional integral derivative (PID) controller for an arbitrary nonlinear model. In the embodiment, the media can hold one or more instructions for automatically determining the portion of the arbitrary nonlinear model to be linearized, where the arbitrary nonlinear model is in a free-form modeling environment. The instructions can linearize the determined portion of the arbitrary nonlinear model, and the linearizing may produce a linear model. The instructions can compute an open-loop frequency response of the linear model and can receive a design specification on behalf of a user, where the design specification identifies a desired gain crossover frequency for the open-loop response, or a desired phase margin at the gain crossover frequency. The instructions may automatically tune PID controller gains using the frequency response and the received input, where the automatic tuning is configured to achieve a desired performance when the PID controller controls the linear model, and to be performed within a time interval that supports interactive PID controller design for the arbitrary nonlinear model. When desired, the embodiment can be configured to allow the desired gain crossover frequency and the desired phase margin to be specified using a displaceable slider associated with a graphical user interface (GUI), or to allow the desired gain crossover frequency to be specified using the displaceable slider and the desired phase margin to be selected automatically. The embodiment can also be configured to allow the tuning to be performed on behalf of a block that interacts with a Simulink-compatible language, or a Simulink model.

In another embodiment, one or more computer-readable media holding one or more executable instructions that when executed on processing logic interface a block representing a controller with an algorithm that generates the controller used in the block when the block executes in a model can be provided. In the embodiment, the media can hold one or more instructions for receiving a linear time invariant (LTI) model. In the embodiment, the LTI model can approximate an arbitrary nonlinear model at an operating condition representing a portion of the arbitrary nonlinear model. The LTI model may further be capable of having delays, and may be capable of having substantially any order. The instructions may further be configured to receive performance and robustness characteristics, where the performance and robustness characteristics are for a controller that controls the LTI model, and where the performance and robustness characteristics identify an open-loop gain-crossover frequency, and an open-loop phase margin. In the embodiment, the instructions can further provide the performance and robustness characteristics to a tuning algorithm that generates a controller satisfying the characteristics, where the tuning algorithm automatically tunes controller parameters satisfying the performance and robustness characteristics. When desired, the block can include a tuning mechanism that causes the controller parameters to be written to the block. In the embodiment, the blocks can allow the user to interactively perform tradeoffs between controller robustness, and controller performance. The embodiment can support providing the controller to the model in real-time, where real-time includes a processing delay that does not adversely impair interactive operation of the block or the controller algorithm by a user. In the embodiment, the controller can be a proportional (P) controller, an integral (I) controller, a proportional derivative (PD) controller (with a derivative filter, or without a derivative filter), a proportional integral (PI) controller, or a PID controller (with a derivative filter, or without a derivative filter).

In still another embodiment, one or more computer-readable media holding one or more executable instructions that when executed on processing logic tune a controller used with a linearized plant model can be provided. In the embodiment, the media can hold one or more instructions for initiating an interactive tuning interface, where the interactive tuning interface is configured for computing loop responses, graphically displaying the loop responses, computing performance and robustness information, graphically displaying the performance and robustness information, tuning parameters for the controller, and for receiving user inputs. The instructions can also linearize the plant model to produce the linearized plant model, where the linearized plant model is controlled by the controller when the plant is executing. The instructions can receive a user input, where the user input specifies a gain crossover frequency, and an open-loop phase margin. The instructions can also tune parameters for the controller, where the tuning is configured for automatically solving certain parameters for the controller based on the specified gain crossover frequency and the open-loop phase margin, automatically optimizing remaining controller parameters within a reduced search space, and producing a tuned controller having characteristics that correspond to the specified inputs. The instructions can further display a response for the tuned controller, where the response indicates how the tuned controller operates with the plant when the plant is executing. In the embodiment, the interactive tuning interface can be used with a proportional integral derivative (PID) controller block in a Simulink model. When desired, the characteristics of the tuned controller can satisfy a merit function. The embodiment can also support performing an optimization with respect to a parameter other than the fixed parameters. In the embodiment, the interactive tuning interface can be configured to include instructions for displaying a rise time, a settling time, an overshoot, a peak, a gain margin, a phase margin, a maximum sensitivity, a maximum complementary sensitivity, or a closed-loop stability. In the embodiment, the plant can be represented as a single input single output (SISO) loop. The embodiment can include instructions for selecting an operating point for the arbitrary nonlinear model, where the operating point indicates where the plant is linearized, and designed, and where the tuned controller controls the arbitrary nonlinear model proximate to the operating point. The embodiment can further be configured to select a second operating point for the arbitrary nonlinear model, produce a tuned controller for controlling the arbitrary nonlinear model proximate to the second operating point, and perform gain scheduling to schedule the tuned controller for the first operating point and the tuned controller for the second operating point.

In yet another embodiment, one or more computer-readable media holding one or more executable instructions that when executed on processing logic determine parameters for a controller having one, two, three or four parameters, where the controller is configured for controlling a nonlinear model. The media can hold instructions for linearizing at least a portion of the nonlinear model in a free-form modeling environment, where the linearizing produces a linear model that is valid over a certain region. The media can also hold instructions for computing an open-loop frequency response of the linear model and for receiving an input for a desired gain crossover frequency for the open-loop response, or a desired phase margin at the gain crossover frequency. The media can also hold instructions for automatically tuning gains using the frequency response, and the received input, where the automatic tuning achieves the desired performance goals, and the automatic tuning is performed during a time interval that supports interactive PID controller design for the arbitrary nonlinear model.

In yet another embodiment, a computer-implemented method for controlling a plant of any order is provided. The method can be configured for interacting with a nonlinear system model using an interactive controller block that is displayable in the system model and for linearizing the system model using the interactive controller block. The method can produce a plant for use in the system model, where the plant is produced based on the linearizing, the plant is of any determined order, and the plant is controlled by the interactive controller block when the system model executes. The method can receive a user input specifying characteristics for the interactive controller block when the interactive controller block executes, where the input includes a gain crossover frequency, and a phase margin. In the embodiment, the input can be received via a graphical user interface (GUI) associated with the interactive controller block. The method can tune a controller associated with the interactive controller block, where the tuning is performed automatically and can include solving for parameters of the controller when there are two or fewer parameters, and solving for two parameters and optimizing for remaining parameters when there are more than two parameters of the controller.

In still another embodiment, an apparatus for controlling a plant of any order is provided. The plant can include a means for interacting with a nonlinear system model and a means for linearizing the system model. The system can also include a means for producing a plant for use in the system model, where the plant produced based on the linearizing, the plant is of any determined order, and the plant is controlled by an interactive controller means when the system model executes. The apparatus can include a means for receiving a user input specifying characteristics for the interactive controller means, where the input specifies a gain crossover frequency, and a phase margin. The apparatus can include a means for tuning a controller associated with the interactive controller means, the tuning performed automatically, where the tuning includes solving for parameters of the controller when there are two or fewer parameters, and solving for two parameters and optimizing for remaining parameters when there are more than two parameters of the controller.

Alternate Merit Functions

As noted above, a merit function may be defined and used to compute values for the free parameters $\alpha$ and $\beta$. Once the free parameters $\alpha$ and $\beta$ are computed, the modeling environment 120 can compute the P,I and D gains and N. The previously described merit function (Eq. 10) sought to minimize setpoint overshoot, and was used to identify values for $\alpha$ and $\beta$ that minimized the merit function, i.e., minimized overshoot, subject to passing the Nyquist Stability Test. Nonetheless, as also noted, other merit functions may be defined and used.

In an embodiment, an alternative merit function may be defined that considers other measures besides or in addition to setpoint overshoot. For example, an alternative merit function may be defined that includes a weighted sum of three measures, and this alternative merit function may be used to compute values for the free parameters $\alpha$ and $\beta$. In particular, the alternative merit function may include terms for a setpoint tracking measure, an input disturbance rejection measure and a robust stability measure. Another alternate merit function may be defined that utilizes the maximum of the three measures.

Setpoint Tracking

A setpoint tracking measure may be defined to minimize overshoot in the output response signal Y 540 (FIG. 5) of the plant 525 to a step change in the setpoint R 505 received at the controller 520.

Setpoint response overshoot may be related to the maximum gain of the closed-loop transfer function T(s). Therefore, let $$\|T\| = \max_{\omega}(|T(j\omega)|).$$

The setpoint overshoot is less than $\tau_{os}\%$ if $\|T\| \leq \beta_{os}$, where $$\beta_{os} = \frac{1}{2}\left(x + \frac{1}{x}\right); \quad x = \min\left[1, \left|\frac{1}{\pi}\ln\left(\frac{\tau_{os}}{100}\right)\right|\right]$$

The function $\beta_{os}(\tau_{os})$ may be approximated by a quadratic equation as shown below:

$$\beta_{os} \approx 0.9663 + 0.0045\,\tau_{os} + 0.00045\,\tau_{os}^2 \qquad (\text{Eq. 12})$$

The inverse function may be given as:

$$\tau_{os} = e^{\frac{-\pi}{\left(\beta + \sqrt{\beta^2 - 1}\right)}}; \quad \beta = \max(1, \beta_{os})$$

Based on the above, a setpoint tracking measure may be given as:

$$F_{RT} = f(\tau_{os}) = 10 e^{\frac{-\pi}{\left(\|T\| + \sqrt{\|T\|^2 - 1}\right)}} \qquad (\text{Eq. 13})$$

Where f ($\tau_{os}$) may be a linear/nonlinear function.

For example, f ($\tau_{os}$) may be chosen as defined by Eq. 13. Notably, this setpoint tracking measure results in an $F_{RT}$ of 1 for a 10% overshoot, and an $F_{RT}$ of 2 for a 20% overshoot. That is, the setpoint tracking measure provides a value of 1 for what is typically a good or acceptable overshoot, e.g., 10%, while providing a value of 2 for what is typically a poor or unacceptable overshoot, e.g., 20%.

Input Disturbance Rejection

In some cases, the control signal U generated by the controller 520 may be subjected to an input disturbance (id) before the control signal is received at the plant 525. Disturbance rejection refers to the controller's ability to return the output response signal Y back to the reference signal or setpoint R following an input disturbance.

An input disturbance rejection measure may be defined to provide quick settling and minimal peak of the plant's output response Y to a set input disturbance (id).

To obtain a term for measuring input disturbance rejection, let $$C(s) = \frac{1}{s} C_L(s) \qquad \text{(Eq. 14)}$$

Then, the settling time and peak value of the input disturbance response may be governed by the ratio:

$$\gamma = \frac{|C_L(j\omega_c)|}{|C_L(0)|} \qquad \text{(Eq. 15)}$$

where $\omega_c$ is the closed-loop bandwidth.

To reduce settling time and peak value, a smaller $\gamma$ may be desired. From Eq. 2 and Eq. 14, $|C_L(j\omega_c)|=1$. Further, $|C_L(0)|$ has an upper bound of $$\cos^2\left(\frac{\varphi_L}{2}\right)$$

for a desired phase lead of $\omega_L$. So that the above equation becomes:

$$\gamma \geq \frac{1}{\cos^2\left(\frac{\varphi_L}{2}\right)} = \gamma_{min} \qquad \text{(Eq. 16)}$$

where $\omega_L$ is the total phase lead required to be provided by $C_L(s)$. Using the above, the input disturbance measure term may be defined as follows:

$$F_{DR} = g\left(\frac{\gamma}{\gamma_{min}}\right) = \left[\frac{\cos^2\left(\frac{\varphi_L}{2}\right)}{C_L(0)}\right]^{0.3} \qquad \text{(Eq. 17)}$$

Where $$g\left(\frac{\gamma}{\gamma_{min}}\right)$$

may be a linear/nonlinear function.

For example, $$g\left(\frac{\gamma}{\gamma_{min}}\right)$$

my be chosen as defined by Eqn 17. Notably, the input disturbance rejection measure (Eq. 17) results in an $F_{DR}$ of 1 for $\gamma=\gamma_{min}$, and an $F_{DR}$ of 2 for a 20DB increase in $\gamma$. That is, in an embodiment, the input disturbance measure also result in a value of 1 for what is typically a good or acceptable input rejection, and a value of 2 for what is typically a poor or unacceptable input rejection, e.g., 20DB.

Robust Stability

A robust stability measure may be defined that provides adequate distance of the closed-loop response L=GC from the critical point (−1,0) in the in the Nyquist Stability plane. A robust stability measure may be defined in terms of a disk gain margin and a disk phase margin associated with an uncertainty model. Let the loop uncertainty be modeled as multiplicative uncertainty of the form $$\Delta(\delta) = \frac{1+\delta}{1-\delta} \qquad \text{(Eq. 18)}$$

where $\delta$ is an uncertainty parameter. If $\delta \leq \alpha$, the loop is robustly stable if $$\|S - T\| \leq \frac{1}{\alpha}; \quad \|S - T\| = \max_\omega(|S(j\omega) - T(j\omega)|)$$

Further, $\delta$ is bounded for a given desired phase margin, $PM_{target}$ as:

$$\delta \leq \alpha = \tan\left(\frac{PM_{target}}{2}\right) = \delta_{target} \qquad \text{(Eq. 19)}$$

For a given closed loop system, $$\delta = \frac{1}{\|S - T\|}; \quad \|S - T\| = \max_\omega(|S(j\omega) - T(j\omega)|)$$

Using the above, the robust stability measure may be defined as:

$$F_{DM} = h\left(\frac{\partial_{t\,arg\,et}}{\partial}\right) = \frac{\partial_{t\,arg\,et}}{\partial} = \tan\left(\frac{PM_{t\,arg\,et}}{2}\right)\|S - T\| \qquad \text{(Eq. 20)}$$

Where $$h\left(\frac{\delta_{target}}{\delta}\right)$$

may be a linear/nonlinear function.

For example, $$h\left(\frac{\delta_{target}}{\delta}\right)$$

may be chosen as defined by Eqn. 20. Notably, $F_{DM}$ is 1 for $\delta=\delta_{target}$, and $F_{DM}$ is 2 for $\delta=\delta_{target}/2$. That is, the robust stability measure of Eq. 20 produces a value of 1 for what is typically understood to be a good or acceptable stability, and a value of 2 for what is typically understood to be a poor or unacceptable stability.

Because the equations for the three measures described above (Eqs. 13, 17 and 20) each produce a value of 1 for a good or acceptable behavior and a value of 2 for a poor or unacceptable behavior, the equations are all in the same relative scale to each other. Accordingly, the three measures may be combined into a single merit function F, which may be written as:

$$F = \frac{w_1 F_{RT} + w_2 F_{DR} + w_3 F_{DM}}{w_1 + w_2 + w_3} \quad \text{(Eq. 21)}$$

where $w_1$, $w_2$ and $w_3$ are settable weights. In an embodiment, the settable weights $w_1$, $w_2$ and $w_3$ may be in the range [0,1], i.e., from 0 to 1.

The values of the weights $w_1$, $w_2$ and $w_3$ may be selected to shape the overall design of the controller to favor one or more performance objectives. For example, setting $w_1$ to zero would result in an input disturbance rejection optimal PID controller, because the setpoint tracking term is effectively ignored. Setting $w_2$ to zero would result in a setpoint tracking optimal PID controller, because the input disturbance term is effectively ignored. By choosing particular values for the $w_1$, $w_2$ and $w_3$ weights, a desired balance among input disturbance, setpoint tracking and robust stability performance may be obtained. More specifically, reducing one of the $w_1$, $w_2$ and $w_3$ weights lowers the controller's performance for the respective measure, while increasing one of the $w_1$, $w_2$ and $w_3$ increases the controller's performance for the respective measure.

In an embodiment, values may be selected for $w_1$, $w_2$ and $w_3$ that balance setpoint tracking and input disturbance rejection, while still providing robust stability of the PID controller.

In an embodiment, the weights $w_1$, $w_2$ and $w_3$ are predetermined and fixed. That is, the modeling environment 120 is configured to apply Eq. 21 using predetermined and fixed values for the weights $w_1$, $w_2$ and $w_3$. The user may not adjust the values assigned to the weights.

In another embodiment, values for one or more of the weights $w_1$, $w_2$ and $w_3$ may be set and/or adjusted by a user. For example, the modeling environment 120 may provide one or more dialogs or panes having data entry boxes or other controls through which a user may assign desired values to one or more of the weights.

In another embodiment, F may be defined as the maximum value of the three measures:

$$F = \max(F_{RT}, F_{DR}, F_{DM}) \quad \text{(Eq. 22)}$$

Figure 13:
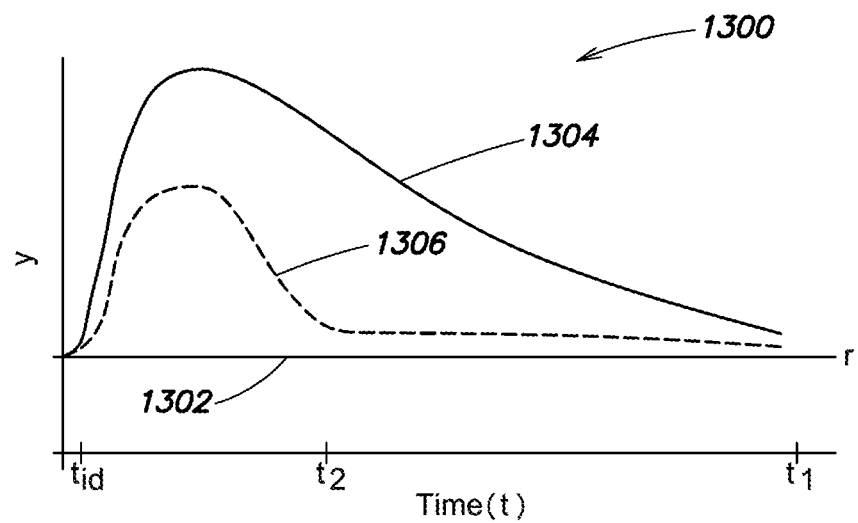
FIG. 13 is a plot of a plant's output versus time.

FIG. 13 is a plot 1300 of a plant's output signal y versus time t. The plot 1300 includes a line 1302 that represents a desired reference or setpoint r, which is constant. The plot 1300 further includes a first curve 1304 that represents the plant's output signal y following the occurrence of an input disturbance (id) to the control signal u generated by a controller and received by the plant. The input disturbance may be considered to occur at a time ($t_0$). As illustrated by the curve 1302, significant time elapses between the occurrence of the input disturbance to the point at which the controller is able to return the plant's output signal y to the desired setpoint r. In particular, the output signal y does not return to the setpoint until approximately time ($t_1$). By adjusting the value for the weight assigned to the input disturbance term, e.g., $w_2$, a controller having a better input disturbance rejection may be obtained. For example, a second curve 1306 represents the output signal y generated by a controller with an adjusted input disturbance weighting, w2. As shown, in this case, the output signal y is returned to the setpoint faster than the prior controller design. In particular, the output signal y is returned to the setpoint at time ($t_2$).

Figure 14:
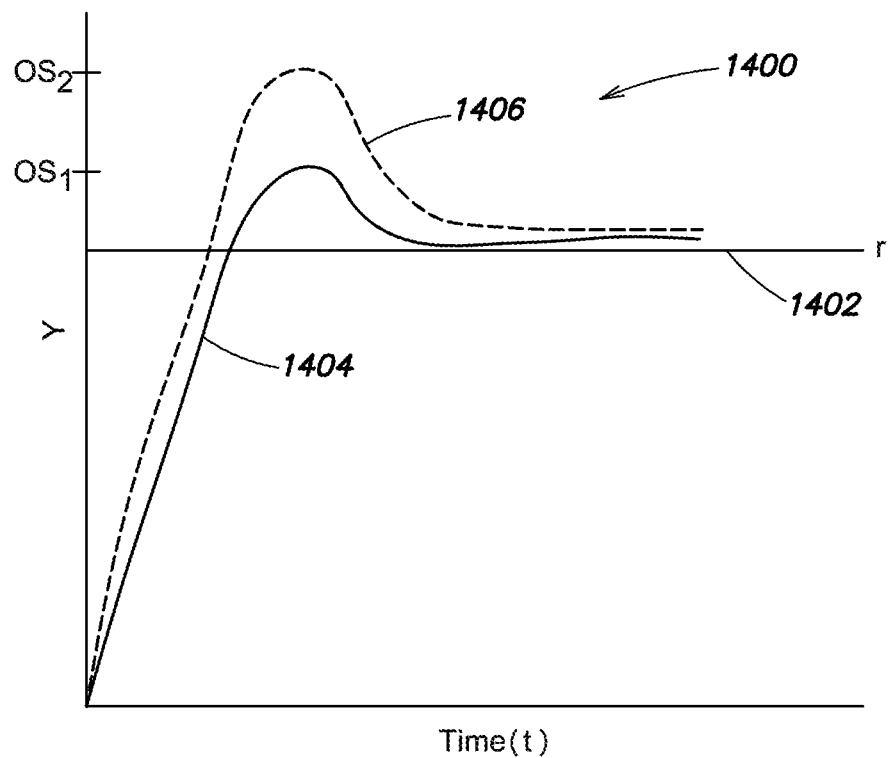
FIG. 14 is a plot of a plant's output versus time.

FIG. 14 is another plot 1400 of a plant's output signal y versus time t, illustrating a response to a step change in the setpoint. The plot 1400 includes a line 1402 that represents the new setpoint r following the step change. The plot 1400 further includes a first curve 1404 that represents the output signal y, following the occurrence of the step change to the setpoint as achieved by a controller designed using the earlier described merit function (Eq. 10). The first curve 1404 reaches a peak overshoot of $OS_1$. The plot 1400 also includes a second curve 1406 that represents the output signal y, following the step change as achieved by a controller utilizing the alternative merit function (Eq. 21) that achieved a better input disturbance rejection, for example as illustrated by the second curve 1306 (FIG. 13). The second curve 1406 reaches a peak overshoot of $OS_2$ that is greater than $OS_1$. As illustrated, while the alternative merit function may produce a controller having improved input disturbance rejection properties, the controller may experience degraded setpoint response performance as compared to a controller designed using the earlier described merit function (Eq. 10). Nonetheless, in an embodiment, a user may accept a reduction in setpoint response performance to achieve an improvement in input disturbance rejection performance.

As with the previously described merit function (Eq. 10), the modeling environment 120 may be configured to compute values for the free parameters α and β using one of the alternate merit function (Eqs. 21 or 22). For example, the modeling environment 120 may choose values for α and β that minimize the merit function (Eqs. 21 or 22). Various search techniques may be used by the modeling environment to find optimal values for α and β using the merit function (Eqs. 21 or 22). Examples of such search techniques include, but are not limited to, brute-force gridding, direct search, and gradient-descent techniques.

For example, a grid may be established where α ranges from 0 to 45 degrees at increments of 5 degrees, and β ranges from 45 to 90 degrees at increments of 5 degrees for a total of 100 grid points (α, β), which may also be referred to as pairs. In addition, grid points or pairs that violate one or more constraints for α and/or β, such as Δφ−90<β−α, and grid points or pairs that fail the Nyquist Stability Test may be discarded. With reference to Eq. 22, an α, β pair may be determined by identifying the maximum measure, i.e., $F_{RT}$, $F_{DR}$ or $F_{DM}$, and evaluating α, β pairs to identify the pair that minimizes the identified maximum measure.

It should be understood that other grids may be established for α and β where the other grids have different ranges and/or increments.

Automatic Tuning of a Two Degree of Freedom PID Controller

The degree of freedom of a control system is defined by the number of closed-loop transfer functions that can be adjusted independently. In the previously described embodiment, the controller included a single transfer function whose parameters were automatically tuned by the modeling environment 120, and thus constitutes a one degree of freedom (1DOF) PID controller. In a further embodiment, a second closed-loop transfer function may be defined so as to establish a two degree of freedom (2DOF) PID controller whose parameters may be automatically tuned by the modeling environment 120. Furthermore, the modeling environment 120 may be configured to employ a two-stage approach for automatically designing the 2DOF PID controller. The two-stage approach may allow real-time designing and tuning of the 2DOF PID controller, where real-time is defined in terms of the user's perspective. In the first stage, the modeling environment 120 may determine a first set of PID controller parameters using the above-described 1DOF solution.

Specifically, the modeling environment 120 may be configured to first compute values for the P, I, D gains and for N for a first transfer function of the controller. In an embodiment, the alternative merit function (Eq. 21) is used in the first stage, rather than the previously described merit function (Eq. 10). In the first stage, desired closed-loop bandwidth, phase margin and closed-loop stability may be achieved. In the second stage, a second set of PID controller values may be determined or tuned for a second transfer function of the controller, thereby providing the 2DOF solution. In the 2DOF solution, the parameters automatically calculated for the first transfer function may be used with the second transfer function, and setpoint weights of the second transfer function may be tuned to reduce overshoot in the closed-loop setpoint response.

Figure 15:
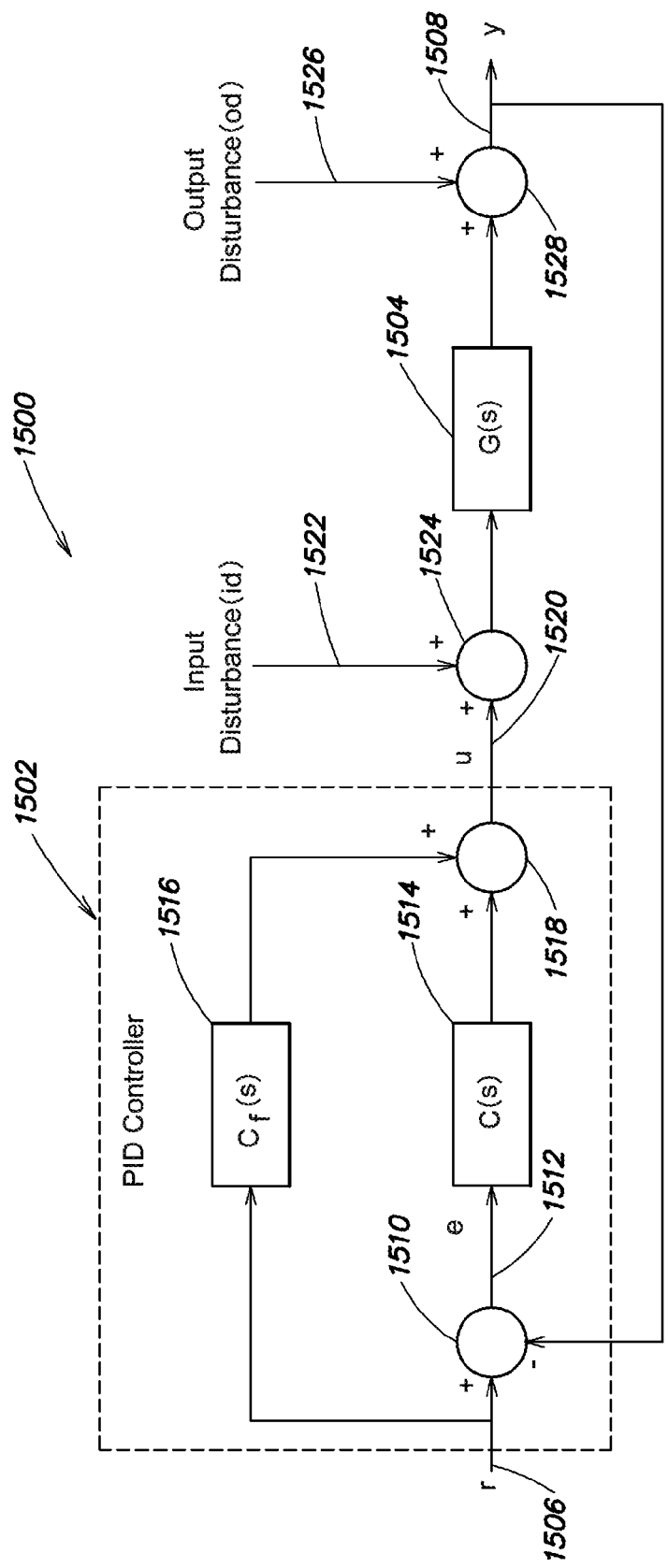
FIG. 15 is a schematic diagram of a model of a single input single output (SISO) system in accordance with an embodiment of the invention.

FIG. 15 is a schematic block diagram of a single input single output (SISO) system 1500 having a PID controller 1502 that controls a plant 1504. The PID controller 1502 receives a reference or setpoint signal r, as indicated by arrow 1506, which represents a desired input value. The plant 1504 generates an output signal y, as indicated by arrow 1508. The output signal y is also fed back to the PID controller 1502 where it is subtracted from the reference signal r by a subtract block 1510, to produce a tracking error signal e as indicated by arrow 1512. A first block 1514 of the PID controller 1502 represents a one degree of freedom (1DOF) control portion term, and a second block 1516 represents a two degree of freedom (2DOF) control portion term. The outputs of the first and second blocks 1514, 1516 are summed by a first Sum block 1518 to produce a control signal u, as indicated by arrow 1520. The control signal u may be subjected to an input disturbance (id) signal, as indicated by arrow 1522. For example, the control signal u may be combined with the input disturbance signal by a second Sum block 1524, and provided to the plant 1504. The output of the plant 1504 may be subjected to an output disturbance (od) signal, as indicated by arrow 1526. For example, the plant's output may be combined with the output disturbance signal by a third Sum block 1528 to produce the output signal y.

The elements of the system 1500 may represent graphical objects supported by the modeling environment 120, and the graphical objects may be arranged in an executable graphical model, for example by a user.

The system 1500 may be a generalized representation of the automobile cruise control system of FIG. 3 in which the PID controller 1502 represents the cruise control system 330 and the plant 1504 represents the automobile 350.

The output u of the controller PID 1502 may be written as:

$$u = K_p(br - y) + \frac{K_i}{s}(r - y) + \frac{K_d s}{T_f s + 1}(cr - y) \qquad \text{(Eq. 23)}$$

where
$K_p$, $K_i$ and $K_d$ are the PID gains, and
b and c are setpoint weights for the proportional and derivative terms, respectively and may be referred to as 2DOF parameters.

Equation 23 may be rearranged as:

$$u = \left[ K_p(r - y) + \frac{K_i}{s}(r - y) + \frac{K_d s}{T_f s + 1}(r - y) \right] + \left[ K_p(b - 1)r + \frac{K_d s(c - 1)}{T_f s + 1} r \right] \qquad \text{(Eq. 24)}$$

which may be written as:

$$u = C(s)(r - y) + C_f(s)r \qquad \text{(Eq. 25)}$$

C(s) may represent a standard continuous-time PID controller having tunable parameters. C(s) may be referred to as a serial or main compensator, and may be written as:

$$C(s) = K_p + \frac{K_i}{s} + \frac{K_d s}{T_f s + 1} \qquad \text{(Eq. 26)}$$

$C_f(s)$ may be referred to as a feedforward compensator, and may be written as:

$$C_f(s) = K_p(b - 1) + \frac{K_d s(c - 1)}{T_f s + 1} \qquad \text{(Eq. 27)}$$

In an embodiment, the modeling environment 120 may be configured to find C(s) and $C_f(s)$ that achieve desired design objectives related to the performance and stability of the closed-loop system.

The closed loop transfer functions from the setpoint signal, r, to the output, y, may be given by:

$$T_{1DOF} = \frac{G(s)C(s)}{1 + G(s)C(s)} \qquad \text{(Eq. 28)}$$

$$T_{2DOF} = T_{1DOF} + \frac{G(s)C_f(s)}{1 + G(s)C(s)} \qquad \text{(Eq. 29)}$$

Eq. 29 may be rewritten as:

$$T_{2DOF} = \frac{G(s)C_2(s)}{1 + G(s)C(s)} \qquad \text{(Eq. 30)}$$

where,
$C_2(s) = C(s) + C_f(s)$.

The closed loop stability of the 2DOF loop is governed by the serial controller C(s) only. Accordingly, stability of the 1DOF loop will guarantee stability of the 2DOF loop. Furthermore, stability margins of the 2DOF loop will be the same as the stability margins achieved for the 1DOF loop.

The feed forward controller portion, $C_f(s)$, only affects the setpoint tracking performance of the controller. Furthermore, when b and c are less than one, $C_f(s)$ will be negative, thereby reducing the setpoint response overshoot as compared to the 1DOF loop.

The closed loop transfer functions from the input and output disturbances, id and od, to the output signal, y, may be given by:

$$D_{1DOF}^{id} = D_{2DOF}^{id} = \frac{G(s)}{1 + G(s)C(s)} \quad \text{(Eq. 31)}$$

$$D_{1DOF}^{od} = D_{2DOF}^{od} = \frac{1}{1 + G(s)C(s)} \quad \text{(Eq. 32)}$$

As shown by Eqs. 30 and 31, the 1DOF loop and the 2DOF loop have the same disturbance rejection properties.

When b=c=1, $C_f$=0 and the 2DOF loop is equivalent to the 1DOF loop.

Furthermore, when b, c<1, then $C_f(s)$ is negative thereby producing a controller having a reduced setpoint response overshoot as compared to a 1DOF controller.

When b, c>1, then $C_f(s)$ is positive, and the setpoint overshoot of the 2DOF loop is greater than the 1DOF loop.

In the first stage, the modeling environment 120 automatically designs a PID controller that satisfies the Nyquist Stability Test for closed loop stability, and that balances the closed loop performance objectives related to setpoint tracking, input disturbance rejection and robust stability. As noted, the alternate merit function (Eq. 21) may be used.

The equation for C(s) may be given by $$C(s) = K_c \frac{\omega_c}{s} \left( \frac{\sin\varphi_z s + \omega_c \cos\varphi_z}{\omega_c} \right) \left( \frac{\sin\beta s + \omega_c \cos\beta}{\sin\alpha s + \omega_c \cos\alpha} \right) \quad \text{(Eq. 33)}$$

where $K_c$, $\varphi_z$, $\beta$, and $\alpha$ are the parameters being automatically determined by the modeling environment 120.

In the second stage, the modeling environment 120 may automatically compute values for b and c of $C_f(s)$, thereby completing the design of the 2DOF PID controller.

In an embodiment, the modeling environment 120 may be configured to compute values for b and c by using a merit function associated with the overshoot in the setpoint response of the 2DOF loop. To improve performance, the merit function may be defined in the frequency domain rather than the time domain. A suitable merit function may be written as:

$$F_{2DOF} = \max_{\omega \leq \omega_c} \max \left[ k_1 \log_{10}\left(\left|\frac{T_{2DOF}(\omega)}{T_{max}}\right|\right), k_2 \log_{10}\left(\frac{T_{min}}{T_{2DOF}(\omega)}\right) \right] \quad \text{(Eq. 34)}$$

where $\omega_c$ is the closed-loop bandwidth of the 1DOF loop, $k_1$ and $k_2$ are constants, and the lower and upper bounds, $T_{min}$ and $T_{max}$, may be given by:

$$T_{min}(\omega) = \min\left( \frac{1}{\max(1, \omega/(\omega_c/1.5))}, |T_{2DOF}(\omega)| \right),$$

$T_{max}(\omega) = 1$

This merit function, $F_{2DOF}$ (Eq. 34), which may be used to compute values for b and c should not be confused with the merit functions used to compute values for the free parameters $\alpha$ and $\beta$ for the 1DOF feedback controller portion (i.e., Eqs. 10, 21 and 22).

In an embodiment, the 2DOF merit function for determining values for setpoint weights b and c is configured to penalize the deviation of the closed loop transfer function magnitude from its desired value, i.e., 1, for all frequencies $\omega < \omega_c$. The desired value is intended to reduce overshoot.

Embodiments may make use of various search techniques to find optimal values for b and c using the merit function (Eq. 33). Examples of such search techniques include, but are not limited to, brute-force gridding, direct search, and gradient-descent techniques.

In an embodiment, the modeling environment 120 may be configured to use a coarse gridding technique. In particular, values for b and c in the range of 0 to 1 may be gridded in increments of 0.05. This would result in a grid having in a total of 400 points to be evaluated. The modeling environment 120 may be configured to evaluate the merit function (Eq. 33) at each or at least some of these grid points, and to select the values for b and c that yield the smallest value of the merit function, i.e., $F_{2DOF}$ (Eq. 33).

Figure 16A:
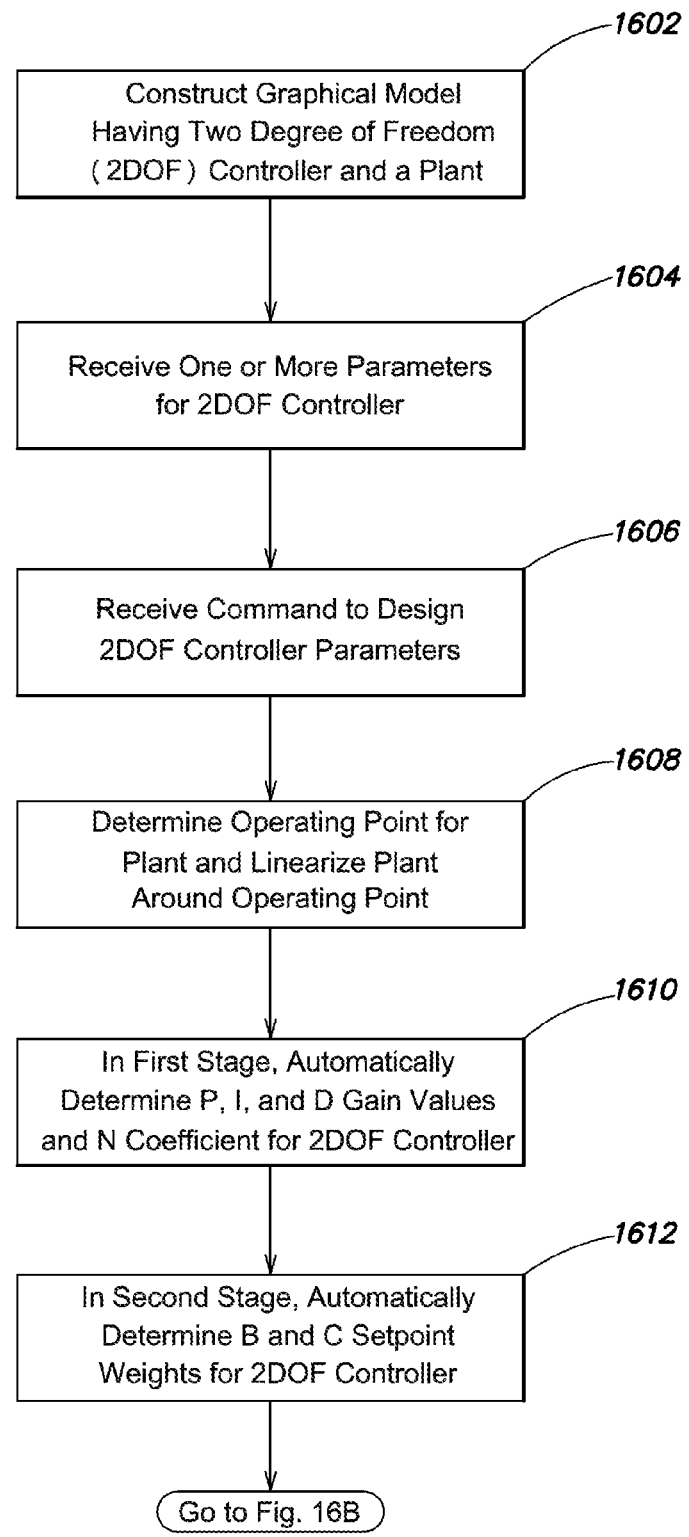
FIGS. 16A and 16B are a flow diagram of a method in accordance with an embodiment of the invention.
Figure 16B:
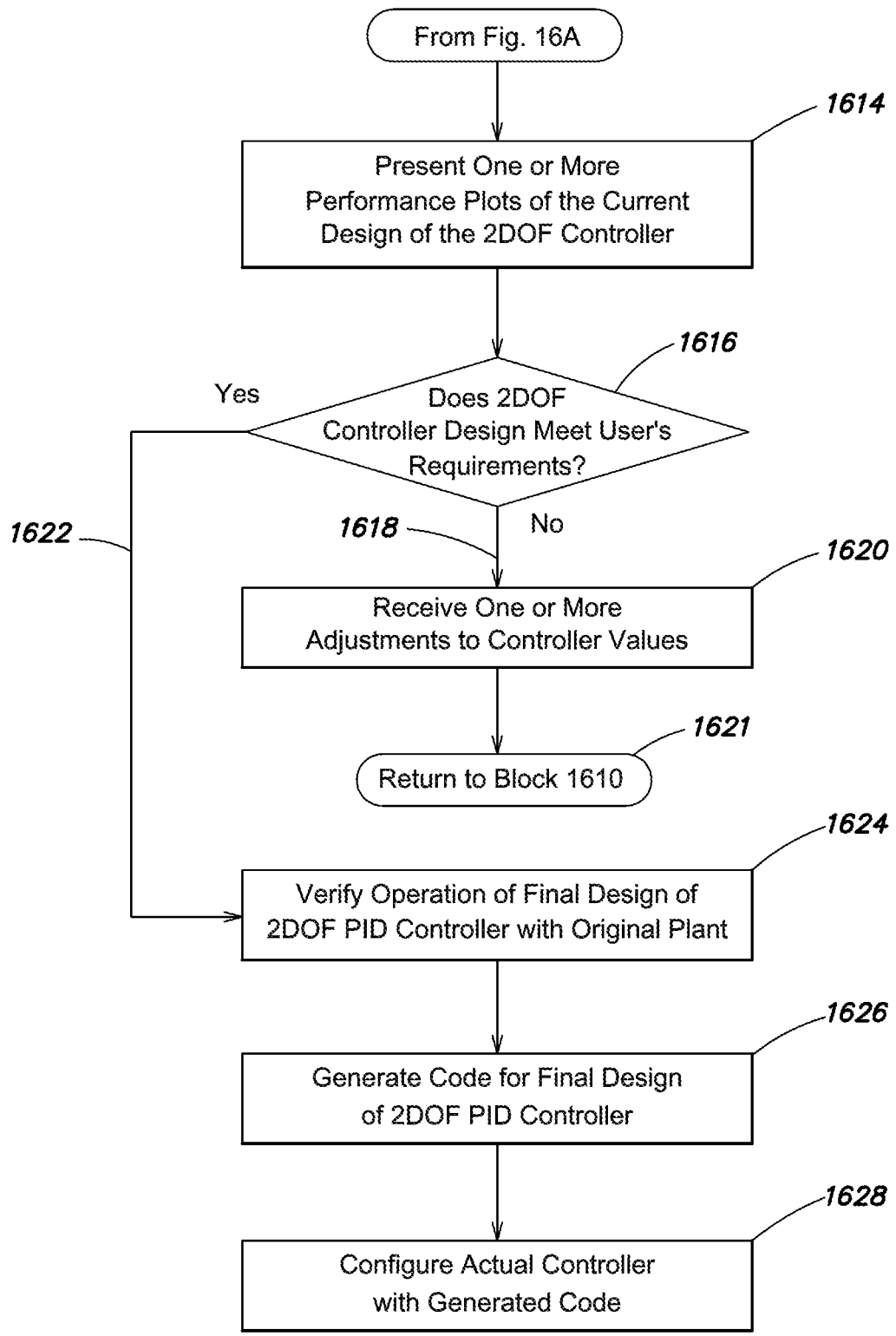

FIGS. 16A and 16B is a flow diagram of a method in accordance with an embodiment of the present invention. A user may construct a graphical model, as indicated at block 1602. The graphical model may include a plant portion and a controller portion. For example, the model may include one or more graphical objects that represent a controller and one or more graphical objects that model the operation of a plant. For example, the modeling environment 120 may include a plurality of predefined graphical objects, including one or more graphical objects that implement a two degree of freedom (2DOF) PID controller. The user may select one of these graphical objects and include it in the model. In addition, the user may select one or more other predefined graphical objects for inclusion in the model and these other graphical objects may be arranged to model the operation of a plant of interest to the user. The graphical model may have executable semantics, and the modeling environment 120 may be configured to execute the graphical model.

The graphical model may be configured so that the 2DOF PID controller object receives a reference or setpoint signal, and provides a control signal to the one or more objects modeling the plant. The model may be further configured such that the 2DOF PID controller object also receives an output signal from the one or more objects modeling the plant.

Instead of constructing a graphical model, the modeling environment 120 may receive and/or open a previously created graphical model, which may be further edited by the user.

The modeling environment 120 may receive one or more parameters for the 2DOF PID controller object of the graphical model, as indicated at block 1604. The one or more parameters may be set by a user or may be determined programmatically. The one or more parameters may include a controller type parameter, which may be set to PID, PI or PD where PID implements a controller with proportional, integral and derivative action, PI implements a controller with proportional and integral action, and PD implements a controller with proportional and derivative action. Other received parameters may include a sample time, Ts, and an integration method for a discrete time case.

The modeling environment 120 may receive a command to automatically design, e.g., tune, the 2DOF PID controller object of the graphical model, as indicated at block 1606. In particular, the modeling environment 120 may provide one or more user interfaces (UIs) for the 2DOF PID controller object. The UI may include a first command button for controlling an automatic tuning process for the 2DOF PID controller object, and the user may select this first command button, which may be labeled 'Tune'.

The modeling environment 120 may perform a series of operation in order to tune the 2DOF PID controller object. For example, the modeling environment 120 may determine an operating point around which to linearize the plant portion of the graphical model, and may linearize the plant portion of the graphical model around this operating point, as indicated at block 1608. The modeling environment 120 may determine the operating point based one or more initial conditions of the model. Alternatively, the user may specify an operating point for the plant portion of the model.

In an embodiment, the modeling environment 120 is configured to apply a two-stage process to tune the 2DOF PID controller object. In a first stage, the modeling environment 120 automatically computes values for the P, I and D gains and for the filter coefficient N, as indicated at block 1610. The modeling environment 120 may utilize the methodology described above, including the alternate merit function (Eq. 33), in order to automatically compute the P, I and D gains and the filter coefficient N. In a second stage, the modeling environment 120 automatically computes values for the setpoint weights b and c, as indicated at block 1612. The modeling environment 120 may utilize the above-described methodology, including the 2DOF merit function (Eq. 33), to automatically compute values for the setpoint weights b and c. In particular, the C(s) portion of the controller function may be tuned first to obtain initial setpoint overshoot, input and output disturbance rejection and stability properties for the 2DOF PID controller object. Tuning the C(s) portion of the controller function produces the P, I, D and N parameters. Next, the $C_f(s)$ portion of the 2DOF PID controller object may be tuned to improve the controller's setpoint overshoot properties without affecting the initial input and output disturbance rejection and stability properties. Tuning the $C_f(s)$ portion produces values for the setpoint weights b and c.

The modeling environment 120 may present a UI having one or more plots that show the performance of the 2DOF controller object as automatically designed by the modeling environment 120, as indicated at block 1614 (FIG. 16B). One of the plots may be a closed-loop step reference tracking response for the initial design of the 2DOF controller object.

A determination may be made whether the design of the 2DOF controller object meet's the user's requirements, as indicated at decision block 1616. The determination may be made by the user by reviewing the one or more performance plots. If the performance of the 2DOF controller object does not meet the user's requirements, the user may refine the design of the controller. More specifically, the user may adjust values for one or more characteristics of the 2DOF controller object, and these adjusted values may be received by the modeling environment 120, as indicated by No arrow 1618 leading to block 1620. For example, the modeling environment 120 may provide one or more UIs having UI elements that allow the user to adjust the controller's closed-loop response time, or to adjust the controller's bandwidth and phase margin. The UI elements may include slider bars, data entry boxes, arrow buttons, etc. The UI elements may be included on the UI having the one or more performance plots of the 2DOF PID controller object.

Exemplary UIs include UIs 800, 900 and 901 illustrated at FIGS. 8, 9A and 9B.

If user adjustments are received, processing may return to block 1610, as indicated by Go To block 1621, and new P, I, D, N, b and c design values may be automatically computed for the 2DOF PID controller object, and a new plot showing the performance of the revised 2DOF PID controller object may be presented. By utilizing a two-stage approach, the computation of new design values for the controller and the plotting of updated performance data may occur in real-time from the user's perspective following an adjustment by the user to the response time, bandwidth or phase margin. This iterative process may be repeated until the user is satisfied with the performance of the 2DOF PID controller object.

Using the accepted design for the 2DOF PID controller object, the modeling environment 120 may verify the operation of the 2DOF PID controller object with the original plant portion of the graphical model, i.e., without linearizing the plant portion, as indicated by Yes arrow 1622 leading to block 1624. The modeling environment 120 also may generate code for the final design of the 2DOF PID controller object, as indicated at block 1626. The generated code may be used to configure an actual, e.g., a physical, controller of a real-world system, as indicated at block 1628. For example, generated code may be used to configure a microprocessor, a Digital Signal Processor (DSP), a programmable hardware element, such as a Field Programmable Gate Array (FPGA), etc.

In another embodiment, the modeling environment 120 may be configured to automatically compute values for b and c indirectly from the equation for $C_2(s)$ (Eq. 29). In particular, Eq. 29 represents the 2DOF closed-loop transfer function, and Eq. 25 represents C(s). $C_2(s)$ may be written as:

$$C_2(s) = K_p b + \frac{K_i}{s} + \frac{cK_d s}{T_f s + 1} = K'_p + \frac{K_i}{s} + \frac{K'_d s}{T_f s + 1} \quad \text{(Eq. 35)}$$

The modeling environment 120 may find an optimal $C_2(s)$ such that the resulting closed-loop response, $T_{2DOF}$, minimizes the 2DOF merit function (Eq. 33). In this case, the b and c parameters may be given by:

$$b = \frac{K'_p}{K_p}; \quad c = \frac{K'_d}{K_d}$$

For tuning, $C_2(s)$ may be parameterized as:

$$C_2(s) = K_c \frac{\cos\varphi_z \cos\beta\omega_c}{\cos\gamma\cos\varphi s} \left(\frac{\sin\gamma s + \omega_c \cos\gamma}{\omega_c}\right)\left(\frac{\sin\varphi s + \omega_c \cos\varphi}{\sin\alpha s + \omega_c \cos\alpha}\right) \quad \text{(Eq. 36)}$$

Notably, $K_c$, $\varphi_z$, $\beta$, and $\alpha$ are known from C(s). Thus, $\gamma$ and $\varphi$ are the two parameters to be determined. Additionally, $sC_2(s)|_{s=0}=sC(s)|_{s=0}$ such that both $C_2(s)$ and C(s) have the same integral gain, $K_i$.

The modeling environment 120 may be configured to use a gridding technique to automatically compute values for $\gamma$ and $\varphi$. For example, the modeling environment 120 may grid each of $\gamma$ and $\varphi$ in the range of 0 to 90° at 5° intervals. The modeling environment 120 may evaluate the gridded values, and select the $\gamma$, $\varphi$ pair that yields the smallest value of the merit function, i.e., $F_{2DOF}$ (Eq. 34).

The effect of $C_2(s)$ on the 2DOF closed-loop may be understood by comparing the 1DOF and 2DOF closed-loop transfer functions as shown below:

$$\frac{T_{2DOF}}{T_{1DOF}} = \frac{C_2(s)}{C(s)} \quad \text{(Eq. 37)}$$

$$20\log(|T_{2DOF}|) - 20\log(|T_{1DOF}|) = 20\log(|C_2|) - 20\log(|C|) \quad \text{(Eq. 38)}$$

This effect may also be illustrated through one or more Bode plots.

Figure 17:
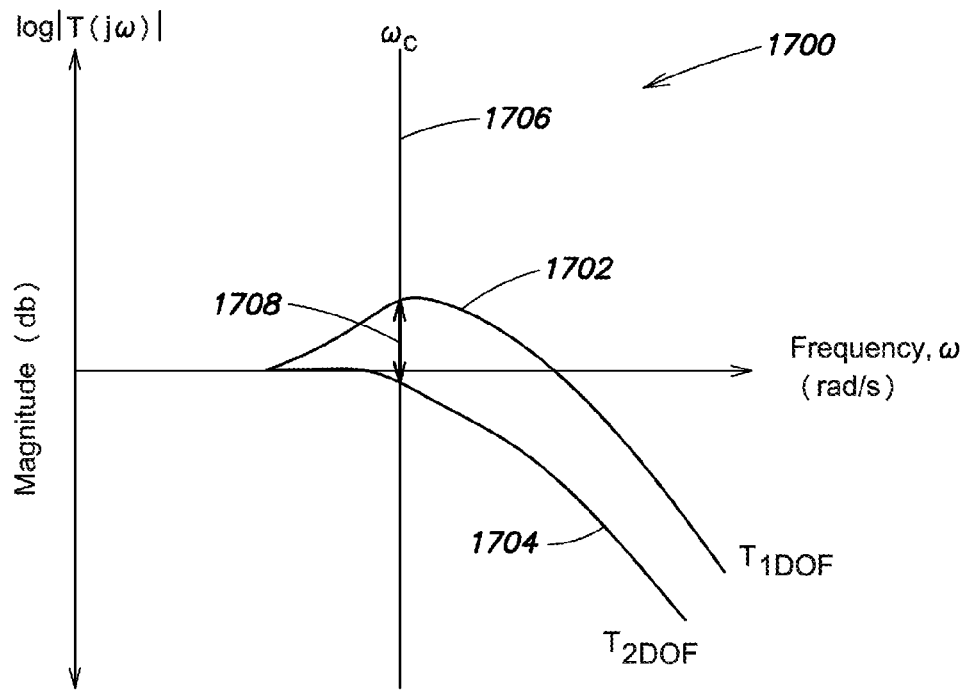
FIG. 17 is a Bode plot of magnitude versus frequency.

FIG. 17 is a Bode plot 1700 of magnitude (in db) vs. frequency (in rad/s). The plot 1700 includes a first curve 1702 for $T_{1DOF}$, and a second curve 1704 for $T_{2DOF}$. At the closed loop bandwidth, $\omega_c$, as indicated at line 1706, the $T_{2DOF}$ provides a shift 1708 to the $T_{1DOF}$.

Figure 18:
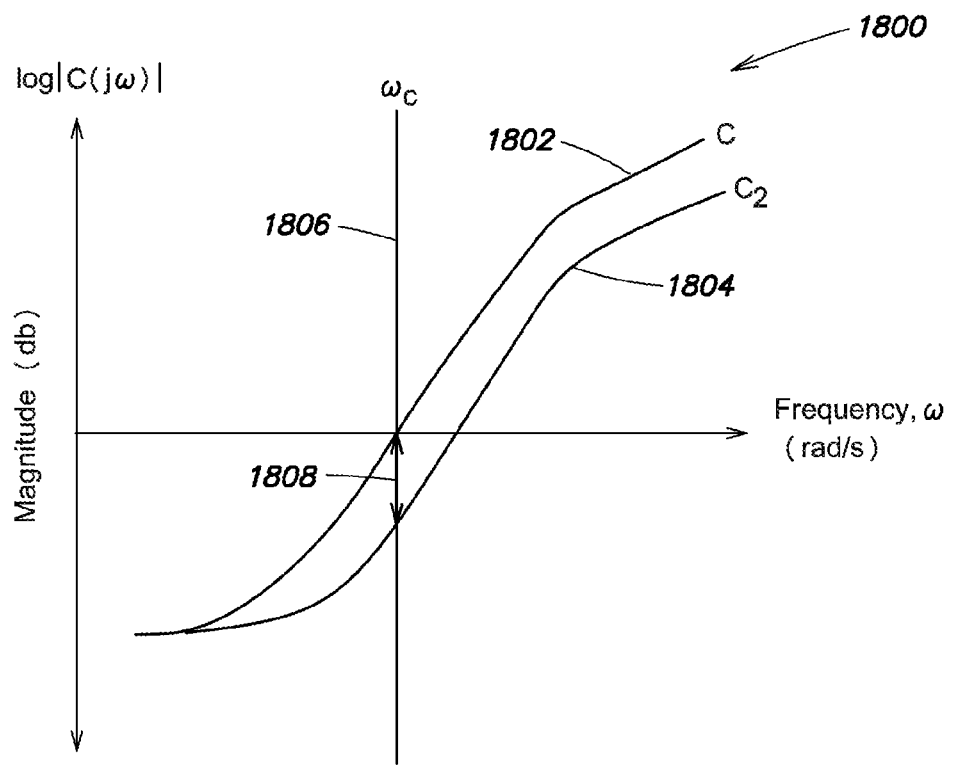
FIG. 18 is a Bode plot of magnitude versus frequency.

FIG. 18 is a Bode plot 1800 of magnitude (in db) vs. frequency (in rad/s). The plot 1800 includes a first curve 1802 for C(s), and a second curve 1804 for $C_2(s)$. At the closed loop bandwidth, $\omega_c$, as indicated at line 1806, $C_2(s)$ provides a shift 1808 to C(s).

Figure 19:
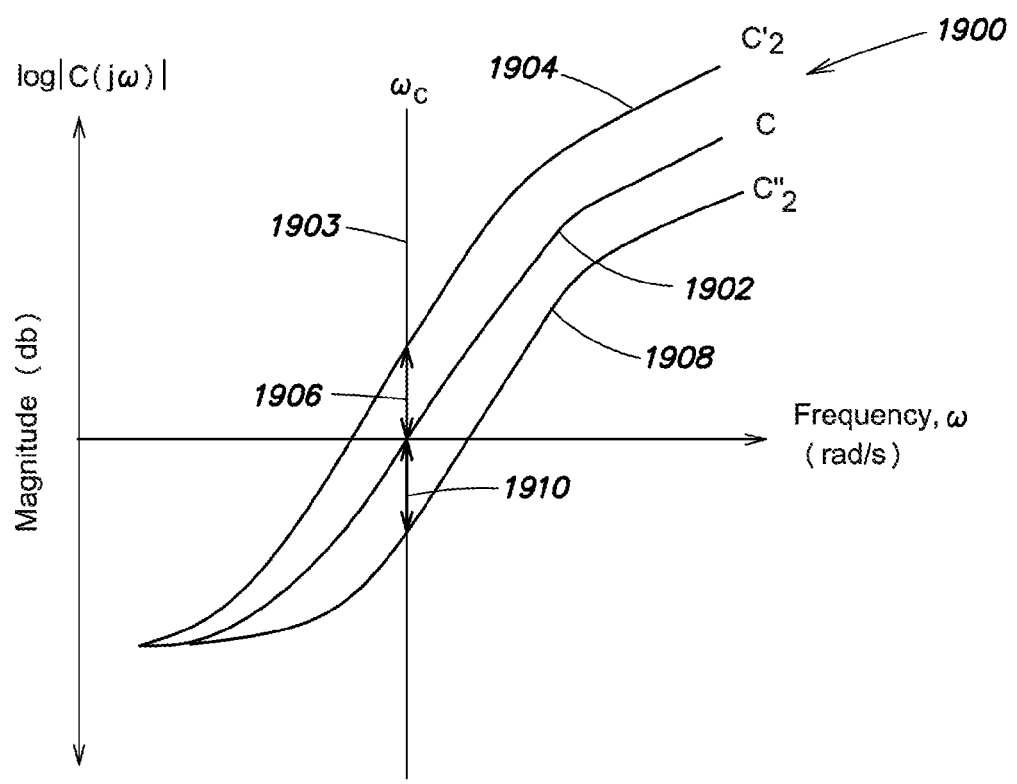
FIG. 19 is a Bode plot of magnitude versus frequency.

With reference to FIGS. 18 and 19, alternative strategies may be developed for gridding $\gamma$ and $\varphi$ depending on the effect to be achieved by the 2DOF parameters on the closed-loop. For example, if the desired effect is to reduce overshoot in the 1DOF setpoint response, then $\gamma$ and $\varphi$ may be gridded over the range from [$\alpha$, min($\beta$, $\Phi_z$)] to [min($\beta$, $\Phi_z$), max($\beta$, $\Phi_z$)]. Alternatively, if the desired effect is to increase overshoot (or bandwidth) in the 1DOF setpoint response, then $\gamma$ and $\varphi$ may be gridded over the range from [max($\beta$, $\Phi_z$), 90°] to [min($\beta$, $\Phi_z$, max ($\beta$, $\Phi_z$)].

FIG. 19 is a Bode plot 1900 of magnitude (in db) vs. frequency (in rads/s). The plot includes a first curve 1902 for C(s), and a line 1903 that represents the closed loop bandwidth $\omega_c$. The plot 1900 further includes a second curve 1904 for $C_2(s)'$ configured to provide a first shift 1906 to C(s) to increase overshoot of the setpoint response, and a third curve 1908 for $C_2(s)''$ configured to provide a second shift 1910 to C(s) to decrease overshoot of the setpoint response.

CONCLUSION

Implementations may allow users to interactively design controllers for system models using characteristics familiar to the user.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while a series of acts has been described with regard to FIGS. 10A and 10B, the order of the acts may be modified in other implementations consistent with the principles of the invention. Further, non-dependent acts may be performed in parallel.

In addition, implementations consistent with principles of the invention can be implemented using devices and configurations other than those illustrated in the figures and described in the specification without departing from the spirit of the invention. Devices and/or components may be added and/or removed from the implementations of FIG. 1, 11 or 12 depending on specific deployments and/or applications. Further, disclosed implementations may not be limited to any specific combination of hardware.

Further, certain portions of the invention may be implemented as "logic" that performs one or more functions. This logic may include hardware, such as hardwired logic, an application-specific integrated circuit, a field programmable gate array, a microprocessor, or a combination of hardware and software. No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

Headings and sub-headings used herein are to aid the reader by dividing the specification into subsections. These headings and sub-headings are not to be construed as limiting the scope of the invention or as defining features of the invention.

What is claimed is:

1. A method comprising:
   for a representation of a Proportional Integral Derivative (PID) controller, the representation including a first free parameter, a second free parameter, a first fixed parameter, and a second fixed parameter,
   selecting a plurality of values for the first free parameter;
   selecting a plurality of values for the second free parameter;
   evaluating, by processing logic, a merit function for pairs that include a first value for the first free parameter and a second value for the second free parameter;
   selecting, by the processing logic, a pair of the pairs for which the merit function is evaluated, the selected pair satisfying the merit function for a determined crossover frequency, where the determined crossover frequency is one of the first fixed parameter or the second fixed parameter, where
   the merit function includes
      a setpoint tracking measure term,
      is an input disturbance rejection measure term, and
      a robust stability measure term;
   determining, by the processing logic, one or more of a Proportional (P) gain, an Integral (I) gain, or a Derivative (D) gain of the PID controller based on the selected pair of values for the first free parameter and the second free parameter satisfying the merit function; and
   generating, by the processing logic, executable instructions to implement the PID controller.

2. The method of claim 1, where the merit function is represented as:

$$F = \frac{w_1 F_{RT} + w_2 F_{DR} + w_3 F_{DM}}{w_1 + w_2 + w_3}$$

where,
$w_1$ is a first weight,
$w_2$ is a second weight,
$w_3$ is a third weight,
$F_{RT}$ is the setpoint tracking measure term,
$F_{DR}$ is the input disturbance rejection measure term, and
$F_{DM}$ is the robust stability measure term.

3. The method of claim 2, where the setpoint tracking measure term is represented as:

$$F_{RT} = 10 e^{\left(\frac{-\pi}{\|T\| + \sqrt{\|T\|^2 - 1}}\right)}$$

where $$\|T\| = \max_\omega(|T(j\omega)|),$$

and T is a closed-loop transfer function.

4. The method of claim 2, where the input disturbance rejection measure term is represented as:

$$F_{DR} = \left[\frac{\cos^2\left(\frac{\varphi_L}{2}\right)}{C_L(0)}\right]^{0.3}$$

where
$\varphi_L$ is a total phase lead, $C_L(0)$ is the gain of $C_L(j\omega)$ where $j\omega=0$.

5. The method of claim 2, where the robust stability measure term is represented as:

$$F_{DM} = \frac{\delta_{target}}{\delta} = \tan\left(\frac{PM_{target}}{2}\right)\|S - T\|$$

where
$\delta$ is a disc margin,
$\delta_{target}$ is a target disc margin,
$PM_{target}$ is a target phase margin,
S is a loop sensitivity function, and
T is a closed loop transfer function.

6. The method of claim 1, where the first fixed parameter is a gain cross over frequency, $\omega_c$, and the second fixed parameter is a phase margin, $\theta_m$.

7. The method of claim 6, where the first free parameter is $\alpha$ and the second free parameter is $\beta$, and $\alpha$ and $\beta$ vary between 0 and 90 degrees.

8. The method of claim 1, where the evaluating includes at least one of:
a direct search technique;
a gradient-descent technique; and
a gridding technique.

9. The method of claim 1, where the evaluating includes a gridding technique performed at determined increments.

10. The method of claim 1, where the merit function is represented as:

$$F = \max(F_{RT}, F_{DR}, F_{DM})$$

where,
$F_{RT}$ is the setpoint tracking measure term,
$F_{DR}$ is the input disturbance rejection measure term, and
$F_{DM}$ is the robust stability measure term.

11. The method of claim 10, where the setpoint tracking measure term is represented as:

$$F_{RT} = 10 e^{\left(\frac{-\pi}{\|T\| + \sqrt{\|T\|^2 - 1}}\right)}$$

where $$\|T\| = \max_\omega(|T(j\omega)|),$$

and T is a closed-loop transfer function.

12. The method of claim 10, where the input disturbance rejection measure term is represented as:

$$F_{DR} = \left[\frac{\cos^2\left(\frac{\varphi_L}{2}\right)}{C_L(0)}\right]^{0.3}$$

where
$\varphi_L$ is a total phase lead, $C_L(0)$ is the gain of $C_L(j\omega)$ where $j\omega=0$.

13. The method of claim 10, where the robust stability measure term is represented as:

$$F_{DM} = \frac{\delta_{target}}{\delta} = \tan\left(\frac{PM_{target}}{2}\right)\|S - T\|$$

where
$\delta$ is a disc margin,
$\delta_{target}$ is a target disc margin,
$PM_{target}$ is a target phase margin,
S is a loop sensitivity function, and
T is a closed loop transfer function.

14. The method of claim 1 further comprising:
identifying a constraint for use with at least one of the first free parameter and the second free parameter; and
discarding at least one of the first free parameter or the second free parameter for violating the constraint.

15. The method of claim 14, where
the first free parameter is $\alpha$ and the second free parameter is $\beta$, and
the constraint is $$\Delta\varphi - 90 < \beta - \alpha,$$

where $\Delta\varphi$ represents a total phase shift of the PID controller.

16. The method of claim 1 further comprising:
discarding at least one pair of the first free parameter and the second free parameter that fail to satisfy a Nyquist stability test.

17. The method of claim 1, where the selected pair of values for the first free parameter and the second free parameter satisfies the merit function by producing a smallest value of the merit function.

18. One or more non-transitory computer-readable media comprising program instructions, the program instructions when executed by a processing element operable to:

initiate an interactive tuning interface, the interactive tuning interface configured to:
  compute one or more loop responses for a model of a controller used with a model of a plant,
  graphically display the one or more computed loop responses,
  compute performance and robustness information for the model of the controller, and
  graphically display the computed performance and robustness information;
linearize at least a portion of the model of the plant to produce a linearized plant model;
receive one or more inputs specifying a gain crossover frequency and an open-loop phase margin for the model of the controller;
automatically tune the model of the controller by
  algebraically solving one or more first parameters of the model of the controller based on the specified gain crossover frequency and the open-loop phase margin,
  optimizing one or more second parameters of the model of the controller;
determine one or more of a Proportional (P) gain, an Integral (I) gain, or a Derivative (D) gain for the model of the controller based on the one or more first parameters and the one or more second parameters;
generate executable instructions to implement the model of the controller; and
display, at the interactive tuning interface, a response of the model of the controller during execution of the model of the controller with the model of the plant, where
  the model of the controller represents the controller using values for a first free parameter and a second free parameter that are determined by satisfying a merit function, and
  the merit function includes
    a setpoint tracking measure term,
    an input disturbance rejection measure term, and
    a robust stability measure term.

19. The one or more non-transitory computer-readable media of claim 18 where the merit function is represented as:

$$F = \frac{w_1 F_{RT} + w_2 F_{DR} + w_3 F_{DM}}{w_1 + w_2 + w_3}$$

where,
$w_1$ is a first weight,
$w_2$ is a second weight,
$w_3$ is a third weight,
$F_{RT}$ is the setpoint tracking measure term,
$F_{DR}$ is the input disturbance rejection measure term, and
$F_{DM}$ is the robust stability measure term.

20. The one or more non-transitory computer-readable media of claim 18, where the merit function is represented as:

$$F = \max(F_{RT}, F_{DR}, F_{DM})$$

where,
$F_{RT}$ is the setpoint tracking measure term,
$F_{DR}$ is the input disturbance rejection measure term, and
$F_{DM}$ is the robust stability measure term.

21. The one or more non-transitory computer-readable media of claim 18, wherein the first fixed parameter is a gain cross over frequency, $\omega_c$, and the second fixed parameter is a phase margin, $\theta_m$.

22. The one or more non-transitory computer-readable media of claim 21, where the first free parameter is $\alpha$ and the second free parameter is $\beta$, and $\alpha$ and $\beta$ vary between 0 and 90 degrees.

23. A method for tuning a proportional integral derivative (PID) controller, the method comprising:
for a design objective for the PID controller, the design objective including:
  a closed-loop stability; and
  a robustness measure,
determining a first value that represents a gain crossover frequency for an open-loop response of the PID controller;
determining a second value that represents a phase margin for the open-loop response;
determining automatically, by processing logic, at least two free parameters of the PID controller to enable the PID controller to satisfy the design objective, the determining the at least two free parameters based on a first transfer function;
determining automatically, by the processing logic, two setpoint weights of the PID controller, the two setpoint weights determining a setpoint overshoot of the PID controller, the determining the two setpoint weights based on a second transfer function, the second transfer function independently adjustable relative to the first transfer function to provide the PID controller with two degrees of freedom (2DOF), the determining the two setpoint weights including
  evaluating a merit function using selected pairs of values for the two setpoint weights to identify a pair of values for the two setpoint weights that satisfy the merit function, the merit function including the second transfer function;
determining, by the processing logic, one or more of a Proportional (P) gain, an Integral (I) gain, or a Derivative (D) gain of the PID controller based on the at least two free parameters determined to enable the PID controller to satisfy the design objective and the pair of values for the two setpoint weights identified as satisfying the merit function; and
generating, by the processing logic, executable instructions to implement the PID controller.

24. The method of claim 23 where
the at least two free parameters are $\alpha$ and $\beta$, and $\alpha$ and $\beta$ vary between 0 and 90 degrees, and
the two setpoint weights are b and c.

25. The method of claim 23 where the evaluating the merit function includes at least one of:
a direct search technique;
a gradient-descent technique; and
a gridding technique.

26. The method of claim 23 wherein the merit function includes an upper bound on the second transfer function and a lower bound on the second transfer function.

27. The method of claim 23 wherein the PID controller is configured to control a model of a plant, the method further comprising:
presenting a plot of a response of the plant to a change in a setpoint signal.

28. The method of claim 27 further comprising:
receiving a change to a performance characteristic of the PID controller;
generating a new PID controller that satisfies the received change to the performance characteristic.

29. The method of claim 28 wherein the performance characteristic of the PID controller is at least one of:

a response time;
a bandwidth frequency; and
a phase margin.

30. The method of claim 28 further comprising:
presenting an updated plot of the response of the plant based on the new PID controller.

31. The method of claim 30 wherein the updated plot is presented in real-time.

32. The method of claim 23 wherein the merit function is given by:

$$F_{2DOF} = \max_{\omega \leq \omega_c} \max\left[k_1 \log_{10}\left(\frac{|T_{2DOF}(\omega)|}{T_{max}}\right), k_2 \log_{10}\left(\frac{T_{min}}{T_{2DOF}(\omega)}\right)\right]$$

where
$\omega_c$ is a closed-loop bandwidth of a one degree of freedom loop of the PID controller,
$k_1$ and $k_2$ are constants, and
$T_{min}$ and $T_{max}$ are lower and upper bounds.

33. The method of claim 32 wherein $T_{min}$ and $T_{max}$ are given by:

$$T_{min}(\omega) = \min\left(\frac{1}{\max(1, \omega/(\omega_c/1.5))}, |T_{2DOF}(\omega)|\right),$$

$T_{max}(\omega)=1$.

34. One or more non-transitory computer-readable medium comprising program instructions, the program instructions when executed by a processing element operable to:
for a first design objective and a second design objective for the PID controller, the first design objective including:
a closed-loop stability, and
a robustness measure, and
the second design objective including reference tracking,
select a first value for a first fixed parameter ($\alpha$);
select a second value for a second fixed parameter ($\beta$); and
adjust a plurality of free parameters of the PID controller when the first value and the second value are specified by tuning the PID controller so that the tuned PID controller satisfies the second design objective, where:
the plurality of free parameters of the PID controller include $\gamma$ and $\varphi$, and
the first and second fixed parameters and the plurality of free parameters are used to express the PID controller in a continuous time expression represented as:

$$C_2(s) = K_c \frac{\cos\varphi_z \cos\beta\omega_c}{\cos\gamma\cos\varphi s}\left(\frac{\sin\gamma s + \omega_c\cos\gamma}{\omega_c}\right)\left(\frac{\sin\varphi s + \omega_c\cos\varphi}{\sin\alpha s + \omega_c\cos\alpha}\right)$$

where
$C_2(s)=C(s)+C_f(s)$,
$C(s)$ represents a serial compensator, and
$C_f(s)$ represents a feedforward compensator; and
determine one or more of a Proportional (P) gain, an Integral (I) gain, or a Derivative (D) gain of the PID controller based on values for the plurality of free parameters, the first value for the first fixed parameter, and the second value for the second fixed parameter, where the values for the plurality of free parameters are determined by evaluating selected values of the plurality of free parameters using a merit function; and
generate executable instructions to implement the PID controller.

35. One or more non-transitory computer-readable media comprising program instructions, the program instructions when executed by a processing element operable to:
for a representation of a proportional integral derivative (PID) controller that includes a first free parameter, a second free parameter, a first fixed parameter, and a second fixed parameter,
select a plurality of values for the first free parameter;
select a plurality of values for the second free parameter;
search a first range that includes one or more of the plurality of values for the first free parameter and the second free parameter, the search performed using an optimization technique;
identify a constraint for use with the one or more of the plurality of values for the first free parameter and the second free parameter;
discard one or more values for the first free parameter and the second free parameter that violate the constraint or that fail to satisfy a Nyquist stability test;
evaluate a first merit function for pairs that include a value of the first free parameter and a value of the second free parameter that are not discarded and that satisfy the Nyquist stability test, the merit function operating in the optimization technique;
select a pair of the first merit function evaluated pairs of values for the first free parameter and the second free parameter that satisfies the first merit function for a determined crossover frequency, where the crossover frequency is one of the first fixed parameter or the second fixed parameter, where
the first free parameter is $\alpha$ and the second free parameter is $\beta$, and
the first merit function selects a value for $\alpha$ and $\beta$;
identify a plurality of values for a third free parameter;
identify a plurality of values for a fourth free parameter;
search a second range that includes one or more of the plurality of values for the third free parameter and the fourth free parameter;
evaluate a second merit function for pairs that include a value of the third free parameter and a value of the fourth free parameter;
select a pair of the second merit function evaluated pairs that satisfies the second merit function, where
the first free parameter is $\gamma$ and the second free parameter is $\varphi$, and $\gamma$ and $\varphi$ are used in the expression:

$$C_2(s) = K_c \frac{\cos\varphi_z \cos\beta\omega_c}{\cos\gamma\cos\varphi s}\left(\frac{\sin\gamma s + \omega_c\cos\gamma}{\omega_c}\right)\left(\frac{\sin\varphi s + \omega_c\cos\varphi}{\sin\alpha s + \omega_c\cos\alpha}\right)$$

where
$C_2(s)=C(s)+C_f(s)$,
$C(s)$ represents a serial compensator, and
$C_f(s)$ represents a feedforward compensator; and
determine one or more of a Proportional (P) gain, an Integral (I) gain, or a Derivative (D) gain of the PID controller based on the selected pair of values for the first free parameter and the second free parameter that satisfies the first merit function; and
generate executable instructions to implement the PID controller.

36. The one or more non-transitory computer-readable medium of claim 33 wherein
   the second merit function is configured to tune reference tracking performance of the PID controller.

37. The one or more non-transitory computer-readable medium of claim 35 wherein the pair of values for the first free parameter and the second free parameter satisfy the first merit function by producing a smallest value of the first merit function, and
   the selected pair of values for the third free parameter and the fourth free parameter first free parameter satisfy the second merit function by producing a smallest value of the second merit function.

* * * * *

UNITED STATES PATENT AND TRADEMARK OFFICE
CERTIFICATE OF CORRECTION

PATENT NO. : 9,886,008 B1
APPLICATION NO. : 13/912956
DATED : February 6, 2018
INVENTOR(S) : Pascal Gahinet et al.

Page 1 of 1

It is certified that error appears in the above-identified patent and that said Letters Patent is hereby corrected as shown below:

In the Claims

Claim 1, Column 34, Line 57 reads:
"is an input disturbance rejection measure term, and"
Should read:
--an input disturbance rejection measure term, and--

Claim 15, Column 36, Line 50 reads:
"the first free parameter is a and the second free parameter"
Should read:
--the first free parameter is $\alpha$ and the second free parameter--

Claim 36, Column 41, Line 2 reads:
"medium of claim 33 wherein"
Should read:
--medium of claim 35 wherein--

Signed and Sealed this
Twenty-eighth Day of April, 2020

Andrei Iancu
*Director of the United States Patent and Trademark Office*